(12) United States Patent
Raval et al.

(10) Patent No.: US 10,359,630 B2
(45) Date of Patent: Jul. 23, 2019

(54) DISPLAY APPARATUS COMPRISING FIRST AND SECOND OPTICAL PHASED ARRAYS AND METHOD FOR AUGMENTED REALITY

(71) Applicant: Massachusetts Institute of Technology, Cambridge, MA (US)

(72) Inventors: Manan Raval, Cambridge, MA (US); Ami Yaacobi, Cambridge, MA (US); Michael R. Watts, Hingham, MA (US); Jerry Zhou, Seattle, WA (US); Jie Sun, Cambridge, MA (US); Christopher V. Poulton, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 323 days.

(21) Appl. No.: 15/199,221

(22) Filed: Jun. 30, 2016

(65) Prior Publication Data
US 2017/0003507 A1     Jan. 5, 2017

Related U.S. Application Data

(60) Provisional application No. 62/274,919, filed on Jan. 5, 2016, provisional application No. 62/216,305, filed
(Continued)

(51) Int. Cl.
*G02F 1/29*     (2006.01)
*G02B 27/00*    (2006.01)
*G02B 27/01*    (2006.01)

(52) U.S. Cl.
CPC ..... *G02B 27/0172* (2013.01); *G02B 27/0075* (2013.01); *G02B 27/0103* (2013.01);
(Continued)

(58) Field of Classification Search
CPC ........ G02B 27/0075; G02B 2027/0152; G02B 2027/0127; G02B 2027/015; G02B 2027/0123
See application file for complete search history.

(56) References Cited

U.S. PATENT DOCUMENTS

| 1,128,979 | A | 2/1915 | Heiss |
| 5,353,133 | A | 10/1994 | Bernkopf |

(Continued)

OTHER PUBLICATIONS

Adelson et al., "The plenoptic function and the elements of early vision," in Computational Models of Visual Processing, MIT, pp. 3-20, 1991.
(Continued)

*Primary Examiner* — Paul C Lee
(74) *Attorney, Agent, or Firm* — Smith Baluch LLP

(57) ABSTRACT

A display for augmented reality (AR) includes an array of optical phased arrays (OPAs) integrated into a transparent substrate. The array of OPAs emit light encoded with four dimensional (4D) light field including 2D spatial coordinates and 2D directional coordinates to create an image of a virtual object on a retina of a viewer. By adjusting the emission directions of light beam emitted by individual OPAs in the display, the depth perception can be adjusted accordingly. The array of OPAs can also be encoded with holographic information, including intensity and phase distribution, of a virtual object to create the image of the virtual object on the retina. The AR display can further incorporate liquid crystal (LC) into the OPAs for modulating the amplitudes and relative phases of light emitted by the OPAs.

26 Claims, 14 Drawing Sheets

Related U.S. Application Data on Sep. 9, 2015, provisional application No. 62/186,752, filed on Jun. 30, 2015.

(52) U.S. Cl.
CPC ..... *G02B 27/0176* (2013.01); *G02B 27/0179* (2013.01); *G02F 1/292* (2013.01); *G02B 2027/015* (2013.01); *G02B 2027/0123* (2013.01); *G02B 2027/0127* (2013.01); *G02B 2027/0134* (2013.01); *G02B 2027/0152* (2013.01); *G02B 2027/0178* (2013.01); *G02B 2027/0187* (2013.01)

(56) References Cited

U.S. PATENT DOCUMENTS

| | | | |
|---|---|---|---|
| 6,522,794 | B1 | 2/2003 | Bischel et al. |
| 7,132,994 | B2 | 11/2006 | Crowley et al. |
| 7,224,526 | B2 | 5/2007 | Putilin et al. |
| 2002/0154377 | A1* | 10/2002 | Pepper .............. G02F 1/13471 359/245 |
| 2006/0033995 | A1* | 2/2006 | Smith .................. G02F 1/292 359/568 |
| 2011/0116017 | A1* | 5/2011 | Gere .................. G02F 1/1323 349/73 |
| 2012/0328298 | A1 | 12/2012 | Yi et al. |
| 2014/0092218 | A1* | 4/2014 | Xu ...................... H04N 13/221 348/46 |
| 2014/0192394 | A1* | 7/2014 | Sun ..................... G02B 6/26 359/289 |
| 2014/0320942 | A1 | 10/2014 | Rosen et al. |
| 2015/0084941 | A1 | 3/2015 | He |

OTHER PUBLICATIONS

Aflatouni, F. et al., "Nanophotonic projection system," Opt. Express, vol. 23, pp. 21012-21022, 2015.
Agocs T. et al., "A Large Scale Interactive Holographic Display," IEEE Virtual Reality Conference (VR 2006), pp. 311-311, 2006.
Alakija, C. et al, "A mobile base station phased array antenna," 1992 IEEE International Conference on Selected Topics in Wireless Communications, 118-121 (1992).
Baier H. et al., "Genetic and optical targeting of neural circuits and behavior—zebrafish in the spotlight," *Curr. Opin. Neurobiol.*, vol. 19, pp. 553-560 (2009).
Barwicz, T. et al., "Silicon photonics for compact, energy-efficient interconnects," Journal of Optical Networking 6 (1) 63-73 (2006).
Barwicz, T. et al., "Polarization Transparent Microphotonic Devices in the Strong Confinement Limit," Nature Photonics, 1, 57 (2006).
Bertaux, N. et al., "Speckle removal using a maximum-likelihood technique with isoline gray-level regularization," J. Opt. Soc. Am. A, vol. 21, pp. 2283-2291, 2004.
Bleha W. et al.,"Advances in Liquid Crystal on Silicon (LCOS) spatial light modulator technology," Proc. SPIE 8736, Display Technologies and Applications for Defense, Security, and Avionics VII, 87360A, 2013.
Block, B. et al., "Electro-optic polymer cladding ring resonator modulators," Opt. Express, vol. 16, pp. 18326-18333, 2008.
Brook J., "Submicrometer Holographic Photolithography," Solid State Technology 33, 91-94 (Nov. 1989).
Brookner, E., "Phased-array radars," Scientific American 252 (2), 94-102 (1985).
Brown B.R. et al, IBM Journal of Research and Development, 13, 160-168, (Mar. 1969).
Cole, D. et al., "Integrated Heterodyne Interferometer with On-Chip Modulators and Detectors", Opt. Lett. 40, 3097 (2015).
Contag, C., "Molecular Imaging Using Visible Light to Reveal Biological Changes in the Brain," *Neuroimag. Clin. N. Am.*, vol. 16, pp. 633-654 (2006).

Cool, S. et al., "Comparison of In Vivo Optical Systems for Bioluminescence and Fluorescence Imaging," vol. 23, pp. 909-920 (2013).
Desmet, H. et al., "Silicon-on-insulator optical waveguides with liquid crystal cladding for switching and tuning," Proc. ECOC, vol. 3, pp. 430-431, 2003.
Doerr, C.et al., "Wide Bandwidth Silicon Nitride Grating Coupler," IEEE Photonic Tech. L., vol. 22, pp. 1461-1463, 2010.
Fan, M. et al., "High Directivity, Vertical Fiber-to-Chip Coupler with Anisotropically Radiating Grating Teeth," Conference on Lasers and Electro-Optics (CLEO), paper CTuDD3, 2007.
Fenn, A. et al., "The development of phased-array radar technology." Lincoln Laboratory Journal 12 (2), 321-340 (2000).
Gabor, D. "A new microscopic principle," Nature 161 (4098), 777-778 (1948).
Gabor, D. "Microscopy by reconstructed wave-fronts," Proceedings of the Royal Society of London A: Mathematical, Physical and Engineering Sciences, 197 (1051), 454-487 (1949).
Geng, J., "Three-dimensional display technologies," Adv. Opt. Photon., vol. 5, pp. 456-535, 2013.
Giancarlo, P. et al., "High-speed digital holographic interferometry for vibration measurement," Appl. Opt. 45, 3456-3462 (2006).
Gillen, G. et al., "Modeling and propagation of near-field diffraction patterns: a more complete approach," American journal of physics 72 (9), 1195-1201 (2004).
Gorin, A et al, "Fabrication of silicon nitride waveguides for visible-light using PECVD: a study of the effect of plasma frequency on optical properties," Opt. Express, vol. 16, pp. 13509-13516, 2008.
Hahn, J. et al., "Wide viewing angle dynamic holographic stereogram with a curved array of spatial light modulators," Opt. Express, vol. 16, pp. 12372-12386 (2008).
Hamagishi, G., "Analysis and improvement of viewing conditions for two-view and multi-view 3D displays," in SID International Symposium Digest of Technical Papers, Society for Information Display, vol. 40, pp. 340-343, 2009.
Hoffman, D. et al., "Vergence-accommodation conflicts hinder visual performance and cause visual fatigue," J. Vis., vol. 8, 2008.
Hong J. et al., "Three-dimensional display technologies of recent interest: principles, status, and issues [Invited]," Appl. Opt., vol. 50, H87-H115, 2011.
Hornbeck, L. et al,"Digital Light Processing and MEMS: an overview," IEEE/LEOS 1996 Summer Topical Meetings, pp. 7-8, 1996.
Hosseini, D. et al,"Output formulation for symmetrically excited one-to-multimode interference coupler," IEEE J. Sel. Top. Quant., vol. 16 pp. 61-69, 2010.
Hulme, J. et al., "Fully integrated hybrid silicon two dimensional beam scanner," Opt. Express, vol. 23, pp. 5861-5874, 2015.
Hÿtch, M. et al., "Nanoscale holographic interferometry for strain measurements in electronic devices," Nature 453 (7198), 1086-1089 (2008).
Jacques, S.,"Optical properties of biological tissues: a review," *Phys. Med. Biol.*, vol. 58 (2013).
Kawaguchi, Y. et al., "Application of phased-array antenna technology to the 21 GHz broadcasting satellite for rain-attenuation compensation," 2002 IEEE International Conference on Communications, 5, 2962-2966 (2002).
Kim, D. "Reduction of coherent artifacts in dynamic holographic three-dimensional displays by diffraction-specific pseudorandom diffusion," Opt. Lett., vol. 29, pp. 611-613, 2004.
Klemm, R.,"Adaptive clutter suppression for airborne phased array radars," IEE Proceedings F (Communications, Radar and Signal Processing), 130 (1), 125-132 (1983).
Kozacki, T., "Wide angle holographic display system spatiotemporal multiplexing," Opt. Express, vol. 20, pp. 27473-27481 (2012).
Kreis, T., "Applications of digital holography: from microscopy to 3D-television," Journal of the European Optical Society-Rapid publications 7, (2012).
Leith, E. et al, "Reconstructed wavefronts and communication theory," JOSA 52 (10), 1123-1128 (1962).
Lerner, J. et al., "Diffraction gratings ruled and holographic—a review," Proc. SPIE 0240, 82-88 (1981).

(56) References Cited

OTHER PUBLICATIONS

Lerosey, G. et al., "Focusing beyond the diffraction limit with far-field time reversal," Science, vol. 315, pp. 1120-1122 (2007).
Levoy, M. et al., "Light field rendering," SIGGRAPH, 1996 Proceedings of the, pp. 31-42, 1996.
Li, J. et al.,"Refractive indices of liquid crystals for display applications," J. Disp. Technol., vol. 1, pp. 51-61, 2005.
Lipson, M., "Guiding, Modulating, and Emitting Light on Silicon—Challenges and Opportunities,".Journal of Lightwave Technology 23 (12) 4222-4238 (2005).
Massoud T. et al., "Molecular imaging in living subjects: seeing fundamental biological processes in a new light," Gene. Dev., vol. 17, pp. 545-580 (2003).
Matusik W., "3D TV: a scalable system for real-time acquisition, transmission, and autostereoscopic display of dynamic scenes," ACM Transactions on Graphics (TOG) 23 (3), 814-824 (2004).
Maycock J. et al., "Reduction of speckle in digital holography by discrete Fourier filtering," J. Opt. Soc. Am. A, vol. 24, pp. 1617-1622, 2007.
McManamon, P. et al., Proc. IEEE 84, 268-298, (1996).
Notaros, J. et al.,"Ultra-Efficient CMOS Fiber-to-Chip Grating Couplers," in Optical Fiber Communication Conference, 2016, p. M2I.5.
Ozawa, T., "Advances in Fluorescence and Bioluminescence Imaging," Anal. Chem., vol. 85, pp. 590-609 (2012).
Packer, A. et al, "Targeting neurons and photons for optogenetics," Nat. Neurosci., vol. 16, pp. 805-815 (2013).
Park, J. et al., "Subwavelength Light Focusing Using Random Nanoparticles." Nat. Photon., vol. 7, pp. 454-458 (2013).
Park, J. et al.,"Three-dimensional display scheme based on integral imaging with three-dimensional information processing," Opt. Express, vol. 12, pp. 6020-6032, 2004.
Peterka, T. et al., "Advances in the Dynallax solid-state dynamic parallax barrier autostereoscopic visualization display system," IEEE Trans. Vis. Comput. Graph., vol. 14, pp. 487-499, 2008.
Poulton, C. et al, "Optical Phased Array with Small Spot Size, High Steering Range and Grouped Cascaded Phase Shifters," in Advanced Photonics 2016 (IPR, NOMA, Sensors, Networks, SPPCom, SOF), OSA technical Digest (online) (Optical Society of America, 2016), paper IW1B.2, 2016.
Resler, D. et al., "High-efficiency liquid-crystal optical phased-array beam steering," Optics letters 21 (9), 689-691 (1996).
Robertson, D. et al., Journal of computer assisted tomography, 19, 967-974 (1995).
Roelkens, G. et al., "High efficiency Silicon-on-Insulator grating coupler based on a poly-Silicon overlay," Optics Express 14 (24), 11622-11630 (2006).
Romero-Garcia, S. et al., "Silicon nitride CMOS-compatible platform for integrated photonics applications at visible wavelengths," Opt. Express, vol. 21, pp. 14036-14046, 2013.
Sincerbox, G., "Holographic scanners: applications, performance and design," Laser Beam Scanning 8, 1-62 (1985).
Soldano L et al., "Optical multi-mode interference devices based on self-imaging: principles and applications" J. Lightwave Technol., vol. 13, pp. 615-627, 1995.
Su, Z. et al., "A silicon wavelength selective partial-drop broadcast filter bank," Opt. Lett. 39, 5459 (2014).
Sun, J et al., "Generating and identifying optical orbital angular momentum with silicon photonic circuits," Opt. Lett., vol. 39, pp. 5977-5980, 2014.
Sun, J. et al., "Large-Scale Nanophotonic Phased Array," Nature, vol. 493, No. 7431 (2013).
Sun, J. et al., "Large-Scale Silicon Photonic Circuits for Optical Phased Arrays," IEEE J. Sel. Top. Quant., vol. 20, pp. 264-278 (2014).
Sun, J., et al., "Integrated Continuously Tunable Optical Orbital Angular Momentum Generator," Conference on Lasers and Electro-Optics (CLEO), Postdeadline Paper JTh5A.5, 2015.
Takaki Y. et al, "Multi-projection of lenticular displays to construct a 256-view super multi-view display," Opt. Express, vol. 18, pp. 8824-8835, 2010.
Tay, S. et al., Nature 451, 694-698 (Feb. 7, 2008).
Timurdogan, E. et al., "A High-Q Tunable Interior-Ridge Microring Filter," in CLEO: 2014, OSA Technical Digest (online) (Optical Society of America, 2014), paper SF2O.3 (2014).
Timurdogan, E. et al., "An ultralow power athermal silicon modulator," Nature Communications, 5, 1 (2014).
Tuchin,V., "Light scattering study of tissues," Phys.-Usp., vol. 40, pp. 495-515 (1997).
Van Acoleyen, K. et al., "Off-chip beam steering with a one-dimensional optical phased array on silicon-on-insulator," Optics letters 34 (9), 1477-1479 (2009).
Van Acoleyen, K. H. Rogier, and R. Baets, "Two-dimensional optical phased array antenna on silicon-on-insulator," Optics express 18 (13), 13655-13660 (2010).
Van Berkel, C. et al, "Characterization and optimization of 3D-LCD module design," Proc. SPIE 3012, Stereoscopic Displays and Virtual Reality Systems IV, pp. 179-186, 1997.
Van Keuk, G. et al.,"On phased-array radar tracking and parameter control," IEEE Transactions on Aerospace Electronic Systems 29, 186-194 (1993).
Van Putten, E. et al., "Scattering lens resolves sub-100 nm structures with visible light," Phys. Rev. Lett., vol. 106, No. 193905 (2011).
Vellekoop I. et al., "Focusing coherent light through opaque strongly scattering media," Opt. Lett., vol. 32, pp. 2309-2311 (2007).
Vellekoop I. et al., "Universal Optimal Transmission of Light Through Disordered Materials," Phys. Rev. Lett., vol. 101, No. 120601 (2008).
Wade, M., et al., "Unidirectional chip-to-fiber grating couplers in unmodified 45nm CMOS Technology," in Conference on Lasers and Electro-Optics, 2014, p. STh3M.5.
Watts, M. et al., "Integrated Mode-Evolution-Based Polarization Rotators," Optics Letters, 30, 138 (2005).
Watts, M. et al., "Integrated Mode-Evolution-Based Polarization Splitter," Optics Letters, 30, 967 (2005).
Watts, M. et al., "Low Voltage, Compact, Depletion-Mode, Silicon Mach-Zehnder Modulator," Journal of Special Topics in Quantum Electronics, IEEE J. Sel. Top. Quantum Electron., 16, 159 (2010).
Watts, M. et al., "Vertical Junction Silicon Microdisk Modulators and Switches," Optics Express, 19, 21989 (2011).
Watts, M., "Adiabatic Microring-Resonators," Optics Letters, 25, 3231 (2010).
Wood C. et al, "Application of real-time holographic interferometry in the nondestructive inspection of electronic parts and assemblies," Proc. SPIE 1332, 122-131 (1991).
Xia X. et al., "A 360-degree floating 3D display based on light field regeneration," Opt. Express, vol. 21, pp. 11237-11247, 2013.
Xiao, X. et al., "Advances in three-dimensional integral imaging: sensing, display, and applications [Invited]," Appl. Opt., vol. 52, pp. 546-560, 2013.
Xing Y. et al., "Digitally Controlled Phase Shifter Using an SOI Slot Waveguide with Liquid Crystal Infiltration" IEEE Photonic Tech. L., vol. 27, pp. 1269-1272, 2015.
Yaacobi, A. et al, "Vertical emitting aperture nanoantennas," Optics letters 37 (9), 1454-1456 (2012).
Yaacobi, A. et al., Opt. Lett. 39, 4575-4578 (2014).
Zhang, F. et al., "Optogenetic interrogation of neural circuits: technology for probing mammalian brain structures." Nat. Protoc., vol. 5, pp. 439-456, 2010.
Zhang, Z. et al., "Fundamentals of phase-only liquid crystal on silicon (LCOS) devices," Light Sci. Appl., vol. 3 (2014).
Zhong, Q., "Multiview and light-field reconstruction algorithms for 360° multiple-projector-type 3D display," Appl. Opt., vol. 52, pp. 4419-4425, 2013.
Zrnic, D. et al., "Agile-beam phased array radar for weather observations,"Bulletin of the American Meteorological Society 88 (11), 1753-1766 (2007).

(56) References Cited

OTHER PUBLICATIONS

International Search Report and Written Opinion issued by the International Searching Authority in regards to International Application No. PCT/US16/40420, dated Mar. 16, 2017, 10 pages.

* cited by examiner

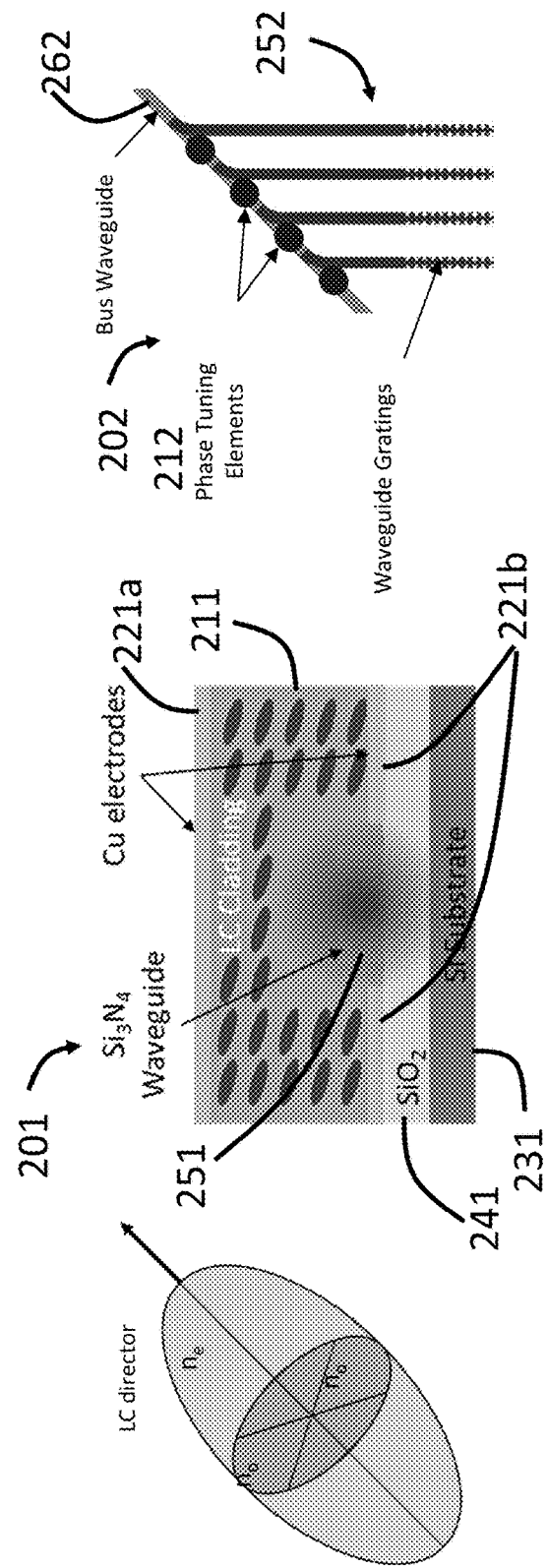

DISPLAY APPARATUS COMPRISING FIRST AND SECOND OPTICAL PHASED ARRAYS AND METHOD FOR AUGMENTED REALITY

CROSS-REFERENCES TO RELATED APPLICATIONS

This application claims priority to U.S. provisional application Ser. No. 62/186,752, filed Jun. 30, 2015, entitled "3D HOLOGRAPHY WITH OPTICAL PHASED ARRAYS," which is hereby incorporated herein by reference in its entirety.

This application also claims priority to U.S. provisional application Ser. No. 62/216,305, filed Sep. 9, 2015, entitled "METHODS AND APPARATUS FOR THREE-DIMENSIONAL HOLOGRAM EMITTING PHASED ARRAYS IN THE NEAR FIELD," which is hereby incorporated herein by reference in its entirety.

This application also claims priority to U.S. provisional application Ser. No. 62/274,919, filed Jan. 5, 2016, entitled "OPTICAL PHASED ARRAYS," which is hereby incorporated herein by reference in its entirety.

GOVERNMENT SUPPORT

This invention was made with Government support under Grant No. HR0011-12-2-0007 awarded by the Defense Advanced Research Projects Agency. The Government has certain rights in the invention.

BACKGROUND

Information access asymmetry, a situation where one party has easier and more continuous access to information compared to another, can be beneficial in military conflicts. The largest bandwidth channel of a human is the visual sensory channel which can receive information at 1250 MB/s, thereby making a visual display a useful way for presenting information and creating information access asymmetry. Traditional displays may be used, but soldiers usually remove their gaze from the outside environment in order to see the information on the display. On the other hand, Head Mounted Displays (HMDs) can relay information to a soldier from a display system embedded in a headset and keep the displayed information in the soldier's field of view (FOV), thereby allowing the soldier to remain fully engaged in the scene and referencing the information to real world objects and events at the same time.

Currently available Augmented Reality (AR) HMDs usually overlay virtual images produced by a micro-display onto the real world via an optical relay system comprised of lens elements and optical combiners. The use of polarization and color filters in typical micro-LCDs, in addition to the use of beam splitters for optical combination, can reduce the light use efficiency of these systems to under 5%. This can result in very high power consumption for producing images bright enough to see in daytime ambient light conditions. Discrete bulk optical components and large power sources can also increase the size and weight of the HMD, thereby hindering its use in scenarios where high mobility is desirable.

In addition, optical relay systems used in commercially available HMDs typically have horizontal and vertical FOVs that are no larger than 40°. In comparison, the near peripheral FOV of the human eye is about 60°. Furthermore, in current HMD architectures, the micro-display image is often magnified such that the image appears at a single virtual focal plane, which may cause vergence-accommodation conflict in binocular systems. A person usually makes two types of responses when seeing scenes with two eyes. The brain of the person converges the eyes so that both eyes are directed at the point of interest (also referred to as vergence). The person also focuses the lens within the eye to sharpen the image on the retina (also referred to as accommodation). When a display produces image appearing at a single virtual focal plane, focus cues—accommodation and blur in the retinal image—typically specify the depth of the display rather than the depths in the depicted scene, while the vergence of the eyes are on the depicted scene, thereby causing conflict between vergence and accommodation. Vergence-accommodation can force the viewer's brain to unnaturally adapt to conflicting cues and increases fusion time of binocular imagery, while decreasing fusion accuracy. This in turn can cause visual fatigue (e.g., asthenopia), making it challenging to have prolonged wearability.

SUMMARY

In view of the issues in conventional Head Mounted Displays (HMDs) and other augmented reality (AR) systems, the inventors have recognized a desire to decrease the size, weight, and power (SWaP) and increase the brightness and FOV in AR headsets. Apparatus and methods of the present technology are generally directed to AR technologies having a low SWaP, high brightness, large FOV, and the ability to provide all binocular and monocular depth cues, thereby allowing maximal situational awareness and information access asymmetry. In one example, an apparatus for augmented reality display includes a first display and a controller. The first display includes a first optical phased array (OPA) to emit a first beam at one of a first plurality of steering angles and a second OPA to emit a second beam at one of a second plurality of steering angles. The controller is operably coupled to the first OPA and the second OPA to steer the first beam through the first plurality of steering angles so as to change a first optical pattern created by the first beam and the second beam on a retina of a viewer.

In another example, an apparatus for augmented reality display includes an array of display modules. Each display module in the array of display modules includes at least one optical phased array (OPA) to emit light at one of N steering angles. Each display module in the array of display modules also includes at least one modulator, operably coupled to the at least one OPA, to modulate a phase of the light emitted by the at least one OPA at a first modulation frequency $f_p$ so as to steer the light emitted by the at least one OPA among the N steering angles. The at least one modulator also modulates an amplitude of the light at a second modulation frequency substantially equal to or greater than $N*f_p$.

In yet another example, an apparatus for three-dimensional display includes a plurality of first optical phased arrays (OPAs). Each first OPA in the plurality of first OPAs transmits a corresponding first light beam toward a first eye of a viewer so as to form a first image in the first eye. The apparatus also includes a plurality of second OPAs. Each second OPA in the plurality of second OPAs transmits a corresponding second light beam toward a second eye of the viewer so as to form a second image in the second eye. The first image and the second image provide depth perception for the viewer.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Overview

Figure 1A:
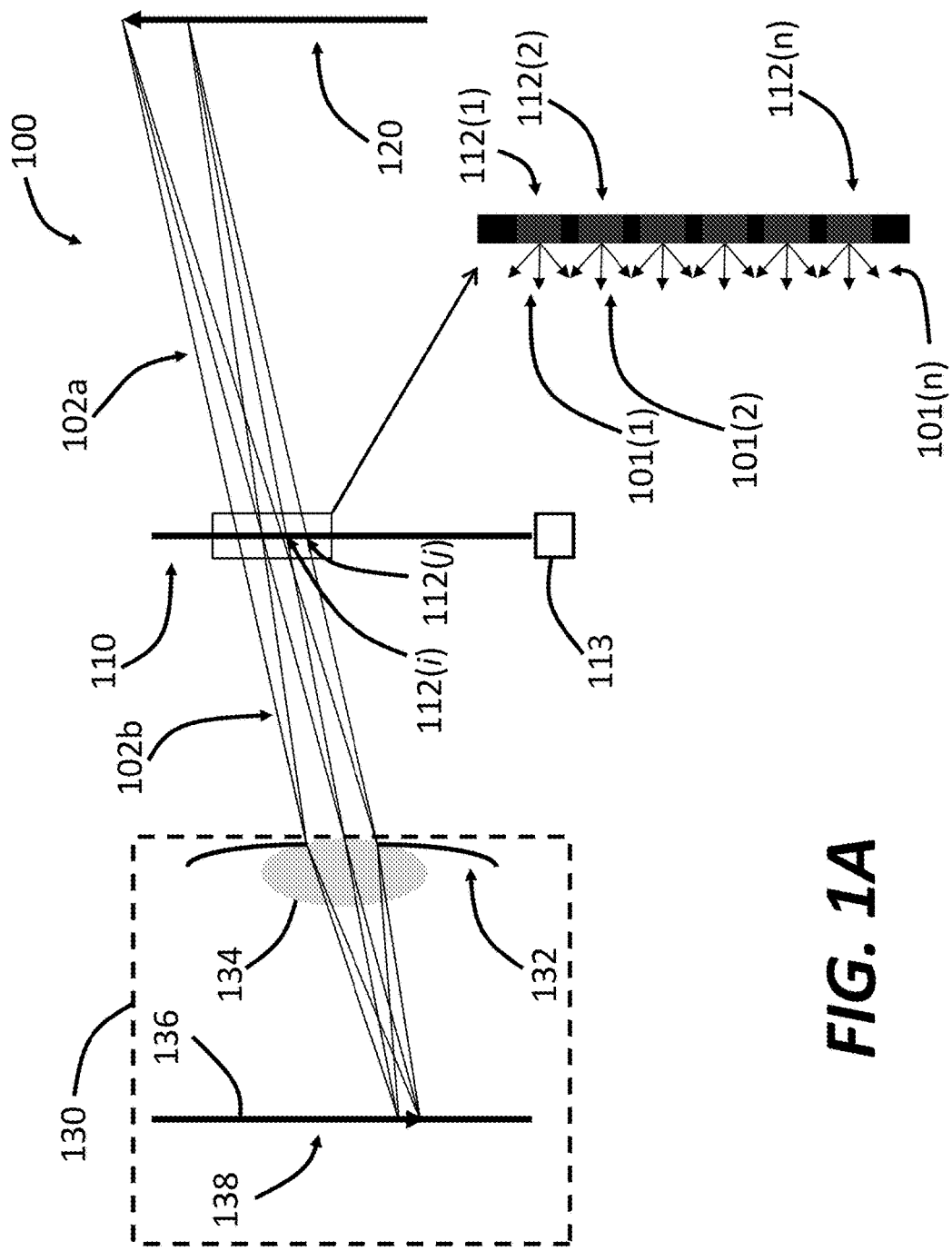
FIG. 1A illustrates an augmented reality system using optical phased arrays (OPAs).

To address the desire to achieve low SWaP, high brightness, and large FOV, and provision of all monocular and binocular depth cues in an augmented reality headset, apparatus and methods described herein employ an approach that combines integrated photonic phased arrays operating at visible wavelengths and modulation platforms with microdisplay thin film transistor backplane and packaging technology. Based on this approach, an AR display includes a grid of integrated nano-photonic OPAs, each of which functions as a pixel. The optical antennas of the OPAs may be encoded with phase gradients along both dimensions to directly emulate the phase front of a virtual scene at the display plane, thereby allowing direct viewing. The AR display can further incorporate liquid crystal (LC) into the OPAs for modulating the amplitudes and relative phases of the beams emitted by the OPAs. For example, phase modulation can be carried out by electrically tuning the refractive index of the LC cladding driven by a serially addressed thin film transistor backplane. Components in the display can be highly transmissive in the visible spectrum, in which case a user can acquire information from the display via virtual image while at the same time seeing through the display to engage in the real world in front of him.

The display can use polarized coherent light sources to illuminate the OPAs and a power recycling amplitude modulation architecture may be implemented using dedicated Mach-Zehnder modulators (MZMs) per pixel. In addition, the optical antennas in the OPAs can be highly unidirectional (e.g., 98%). Using these techniques can further reduce power consumption of the resulting display without sacrificing the high luminance (e.g., greater than 25,000 $cd/m^2$) delivered by the display. Furthermore, unidirectional antennas can render the display visually undetectable to external onlookers.

In operation, one display can be placed in front of each eye to provide binocular disparity while each display can be used to encode a 4D light-field or hologram representing the desired virtual object to provide monocular depth cues, thereby resolving the vergence-accommodation conflict. The display can be less than 10×10 $cm^2$ in size (e.g., less than 10×10 $cm^2$, less than 8×8 $cm^2$, less than 5×5 $cm^2$, less than 4×4 $cm^2$, less than 3×3 $cm^2$, or less than 2×2 $cm^2$, including all values and sub ranges in between), weigh less than 20 g (e.g., less than 20 g, less than 15 g, less than 10 g, less than 8 g, or less than 5 g, including all values and sub ranges in between), and have a low power consumption less than 300 mW (e.g., less than 300 mW, less than 250 mW, less than 200 mW, less than 150 mW, or less than 100 mW, including all values and sub ranges in between) while still generating a luminance greater than 15,000 $cd/m^2$ (greater than 15,000 $cd/m^2$, greater than 20,000 $cd/m^2$, greater than 25,000 $cd/m^2$, or greater than 30,000 $cd/m^2$, including all values and sub ranges in between). The display can be configured to have a field of view exceeding 60°×40° (e.g., greater than 60°×40°, greater than 65°×45°, greater than 70°×50°, or greater than 75°×55°, including all values and sub ranges in between). The displays can have up to or greater than Super Video Graphics Array (SVGA) resolutions.

OPA-based AR displays can have several advantages over conventional AR displays. For example, the displays can provide a low SWaP and direct-view with large FOV. The displays can also be highly transparent (e.g., greater than 94%) and therefore do not interfere with the normal vision of the viewer. The OPAs in the display can be encoded with either light field or holographic image projection modalities for solving the vergence-accommodation conflict. In one example, photonics and electronics of the display can be fabricated on a 193 nm ultraviolet (UV) immersion lithography process and a 250 nm CMOS process in state-of-the-art foundries for low-cost manufacturing. In another example, photonics and electronics of the display can be fabricated on a 65 nm CMOS process and a 250 nm CMOS process.

FIG. 1 shows a schematic of a system 100 including a display 110 to create augmented reality for a viewer. The display includes an array of optical phased arrays (OPAs) 112(1), 112(2), . . . , and 112(n) (collectively referred to as OPAs 112). Each OPA 112(j) (j=1, 2, . . . , n) in the array of OPAs 112 functions as a pixel in the display and is configured to emit a light beam 101(j), which can have a plurality of emission angles (also referred to as steering angles). The emission angle of the light beam 101(j) can be controlled by tuning the relative phase gradient between optical antennas in the corresponding OPA 112(j). The display 110 includes a controller 113 to control the phase gradient. More information about OPAs can be found in U.S. Pat. No. 8,988,754, which is hereby incorporated herein by reference in its entirety.

In the system 100, the display 110 is placed in front of the eye 130 of a viewer to create an image 138 of a virtual object 120 on the retina 136 of the viewer. The creation of the image 138 by the display 110 can be illustrated by considering two scenarios. In the first scenario, the system 100 includes no display 110 but has the object 120. Light rays 102a and 102b (collectively, light rays 102) reflected or emitted by the object 120 propagate to the aperture 132 and lens 134 of the viewer's eye 130 and create the image 138 on the retina 136. In the second scenario, the system 100 includes the display 110 but not the object 120. The display 110 is configured to emit light rays 102b, which are the same light rays 102b in the first scenario when the object 120 is present, toward the eye 130 of the viewer. In this manner, the display 110 can create the image 138 as if a virtual object 120 is present in front of the eye 130. In other words, a viewer behind the display 110 can see the virtual object 120.

There are at least two methods to configure the display 110 (also referred to as encoding) so as to create the image 138 of the virtual object 120. One method is usually referred to light field encoding. In this method, the light rays 102 at the location of the display 110 are simulated by a four dimensional (4D) light field. Each point in the 4D light field includes a two dimensional spatial location (e.g., a coordinate (x, y)) and a two dimensional direction (e.g., a coordinate (θ, ξ)). Therefore, the display 110 can create the light rays 102 by controlling each OPA 112 in the display 110 to emit an individual light beam with a 4D coordinate (x, y, θ, ξ) corresponding to a point in the 4D light field of light rays 102b. For example, as shown in FIG. 1, a first OPA 112(i) at a first location in the display 110 emits a light ray at a first direction toward the eye 130, while a second OPA 112(j) at a different location in the display 110 emits a light ray at a different direction, thereby simulating the light rays 102b and creating the image 138 on the retina 136 of the eye 130.

In this first method, each OPA 112 in the display 110 is independently controlled such that it can emit light beams at arbitrary angles free of influence from other OPAs in the display 110. To this end, the optical path length difference between adjacent OPAs 112, which can depend on the distance between adjacent OPAs 112, in the display 110 can be longer than the coherence length of the light beams emitted by the OPAs 112 such that the emitted light beams from adjacent OPAs 112 are not coherent with each other. Independent control of each individual OPA 112 in the display allows the display 110 to conveniently create images 138 having different patterns (i.e., intensity distribution) and depth cues (sometimes also referred to as depth perception). By tuning the directions of light beams emitted by each OPA 112, the display 110 can adjust the depth cues of the image 138 (see, e.g., FIG. 3 and the corresponding description). By tuning the light intensity of light emitted by each OPA 112, the display 110 can create different patterns of image 138 on the retina 136.

In one example, the optical path length difference between adjacent OPAs can be adjusted by changing the pitch of the array of OPAs 112. In another example, the optical path length difference between adjacent OPAs can be adjusted by including a phase tuning element (also referred to as delay element) between the two OPAs.

The coherence length of the light beam can be determined by the light source. For example, lasers can provide light beams having coherence lengths longer than 1 meter. Light emission diodes (LEDs) can provide light beams having a coherence length on the order of 10 μm (e.g., 10 μm, 20 μm, 30 μm, 40 μm, 50 μm, 60 μm, or longer). Therefore, for different light sources that illuminate the display 110, the optical path length difference between adjacent OPAs in the display 110 can be adjusted accordingly. More specifically, if the optical path length difference between first and second OPAs is longer than the coherence length of the light source, the first OPA will emit beams that are incoherent with beams emitted by the second OPA. And if the optical path length difference between the first and second OPAs is shorter than the coherence length of the light source, the first OPA may emit beams that are coherent with beams emitted by the second OPA.

A second method of encoding light emitted by the display 110 is usually referred to as holographic method. In this method, light rays 102b are emulated by a holographic field. Each point in the holographic field can be represented by its intensity and phase (I, φ). Therefore, the display 110 can create the light rays 102b by controlling each OPA 112 in the display 110 such that each optical antenna in OPA 112 can function as a point light source having an intensity and phase (I, φ) corresponding to a point in the desired hologram.

In the second method, individual light beams emitted by the OPAs 112 can be coherent to with other. To this end, the optical path length difference between adjacent OPAs 112 in the display 110 can be less than the coherence length of the light beams emitted by the OPAs 112. Since individual light beams from the OPAs 112 in the display 110 are coherent with each other, the entire display 110 effectively functions as a single aperture. In comparison, in the light field encoding method, each individual OPA 112 functions as an individual aperture. As readily understood in the art, a larger aperture can lead to smaller diffraction limit and high spatial resolution if used for imaging. Therefore, using holographic encoding can utilize the whole area of the display as an aperture and achieve higher spatial resolution in the image 138.

The system 100 shown in FIG. 1 uses an eye 130 of a viewer as an example to illustrate the operation of the display 110. In this example, the display 110 can be integrated into eyewear. For example, the display 110 can be integrated into a head mounted display (HMD), a spectacle lens, a sunglass, or any other eyewear known in the art.

Figure 1B:
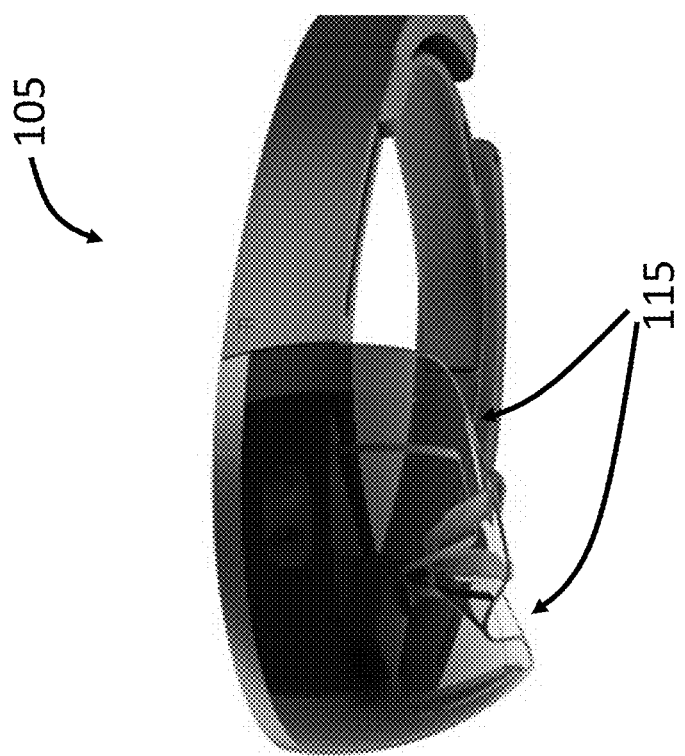
FIG. 1B illustrates a Head Mounted Display (HMD) that can use displays including OPAs.

FIG. 1B shows a HMD 105 including two OPA displays 115 for augmented reality. Each display 115 can be substantially similar to the display 110 shown in FIG. 1A and described above. A viewer wearing the HMD 105 can conveniently acquire information from the displays 115 without interrupting his or her vision of the real world in front of him of her.

In practice, other systems can also be used to supplement the eye 130. For example, the aperture 132 can use any type of aperture known in the art, such as a diaphragm. The lens 134 can be replaced by any focusing element, such as a spherical lens, a Fresnel zone plate (or other focusing device based on diffraction), a spherical reflector, an oval reflector, or their combinations. The retina 136 can be replaced by a screen, detector, or photographic film, among others.

When used in HMDs, the display 110 can create the image 138 via either a pupil-forming architecture or a non-pupil-forming architecture. In a pupil forming architecture, the display 110 produces an intermediate image which allows the integration of interesting optical functionalities, such as exit pupil expanders (EPE). For example, the intermediate image can be created by a first set of lens(es) and then relayed by another set of lens(es) to where it creates a pupil, or a hard image of the aperture stop. A pupil-forming architecture can provide more path length from the image plane to the eye, thereby providing more freedom to insert mirrors to fold the optical train away from the face to a more advantageous weight and center of gravity location.

In the non-pupil-forming architecture, the display 110 usually directly projects the light field into the viewer's eye to produce an image. While non-pupil-form architecture can be more compact, it can also be less flexible. For example, the eye box of non-pupil forming HMDs is usually smaller than the one of pupil forming HMDs and additional EPEs may be used to address this issue.

The display 110 can include various numbers of OPAs arranged in various configurations. For example, the display 110 can include 8×8 OPAs 112, 16×16 OPAs 112, 32×32 OPAs 112, 64×64 OPAs 112, 128×128 OPAs 112, or more. In another example, the display 110 can have QVGA (Quarter Video Graphics Array) resolution by having 320×240 OPAs 112. In another example, the display 110 can have SVGA (Super Video Graphics Array) resolution by having 800×600 OPAs 112. In one example, the display 110 can have an aspect ratio of 4:3. In another example, the display 110 can have an aspect ratio of 16:9. Each OPA can be less than 50 μm (e.g., less than 50 μm, less than 40 μm, less than 30 μm, less than 20 μm, less than 15 μm, or less than 10 μm, including all values and sub ranges in between).

The OPAs 112 can be arranged in various configurations. In one example, the OPAs 112 can be arranged in square shapes or rectangular shapes depending on the number of OPAs on each direction (i.e., row and column). In another example, the OPAs 112 can be arranged in a circle, oblong, or oval shape to accommodate the shape of a spectacle lens frame.

The OPAs 112 and the resulting display 110 can be substantially transparent such that the virtual object 120 can be overlaid on any real object in the viewer's field of view. In this case, the viewer can fully engage in the scene surrounding her while acquiring additional information provided by the display 110. In one example, the OPAs 112 can be implemented in sub-wavelength silicon nitride layers which are also transparent in the visible spectrum. Any additional substrate (e.g., substrate for mechanical support) can also be transparent (e.g., using glass, plastic, polymer substrate), therefore producing a fully transparent direct-view near-eye display 110.

In another example, the OPAs 112 can be fabricated in a 300-mm CMOS foundry with a 65-nm technology node, using SOI wafers with a 0.22 μm top silicon layer and 2 μm buried oxide (BOX) as the under cladding. A shallow silicon etch with a target depth of 0.1 μm can be first performed with hydrogen bromide (HBr) timed dry etch to form a first grating groove which can provide the up-down asymmetry of the optical antennas. A full silicon etch can then be carried out to define the rest of the structure with the BOX layer as the etch stop by taking advantage of the high selectivity (>100:1) of HBr in etching Si over $SiO_2$. Then a layer of 3 μm tetraethyl orthosilicate (TEOS) $SiO_2$ can be deposited on top of silicon as the over-cladding, followed by a chemical mechanical polishing (CMP) step to planarize the top surface to avoid additional phase errors due to surface corrugation which is essential for the phased array applications. More information about fabrication of OPAs can be found in U.S. Pat. No. 8,988,754, which is hereby incorporated herein by reference in its entirety.

The controller 113 in the display 110 is configured to control the modulation, including phase modulation and amplitude modulation, of the OPAs 112. In one example, the controller 113 can modulate the phase of the OPAs 112 at a phase modulation frequency $f_p$ and therefore modulate the emission direction at the same phase modulation frequency $f_p$. The phase modulation frequency $f_p$ can be greater than 60 Hz (e.g., greater than 60 Hz, greater than 70 Hz, greater than 80 Hz, greater than 90 Hz, greater than 100 Hz, greater than 150 Hz, greater than 200 Hz, or more), in which case human brains may not distinguish the discrete modulation. In other words, human eyes perceive a continuous transition of images at those phase modulation frequencies. At the same time, the controller 113 can modulate the amplitude of the OPAs 112 at an amplitude modulation frequency $N*f_p$, where N is an integer number. In other words, for each phase modulation, the controller 113 modulates the amplitude N times, thereby creating N different intensity patterns in the eyes of the viewer for providing monocular depth cues. In one example, N can be greater than 3. In another example, N can be greater than 5 (e.g., greater than 5, greater than 7, greater than 10, or greater than 15).

Using this technique and a lens placed in front of each OPA, each pixel OPA can effective function as N pixels, because the transition among the N different patterns is faster than the perception time of human eyes and these N different patterns can effectively coalesce into a single image in the viewer's perception. Stated differently, this technique can increase the effective pixel number of the display by N. The OPAs can have the same brightness compared to displays without dynamic steering, because the image is created on the retina from images at different moments in time. In addition, since fewer OPAs can be used, for a given form factor (or size constraint), each OPA can have a larger size, thereby providing a higher angular resolution, which can be inverse proportional to the size of the emitter OPA.

Optical Phased Arrays Including Liquid Crystals

As introduced above, the display 110 can create different depth cues for the viewer by adjusting the emission angles of the OPAs 112. The emission angles of the OPAs 112, in turn, can be controlled by the phase gradient across the antennas in each OPA. As introduced above, the OPAs 112 can be implemented in silicon nitride, which is transparent to visible light and compatible with the Complementary Metal-Oxide-Semiconductor (CMOS) fabrication process used for the integrated silicon photonics platform. However, silicon nitride typically does not exhibit significant thermo- or electro-optic effects, which are usually relied on in OPAs to adjust the phase of the light beams emitted by OPAs. To address this issue, a layer of liquid crystal material can be applied above the phased array or as the cladding of an integrated waveguide region between optical emitters or above the phased array for modulating the phase of each emitter. A localized electric field can be applied in its vicinity of each emitter, using transparent electrodes, to tune the refractive index as seen by the light propagating through the liquid crystal region corresponding to a given emitter. Phase tuning using an integrated waveguide with a liquid crystal cladding may be referred to as in-plane modulation, while phase tuning in an overlying liquid crystal layer, which tunes the phase of emitted light, may be referred to as out-of-plane modulation.

Figure 2A:
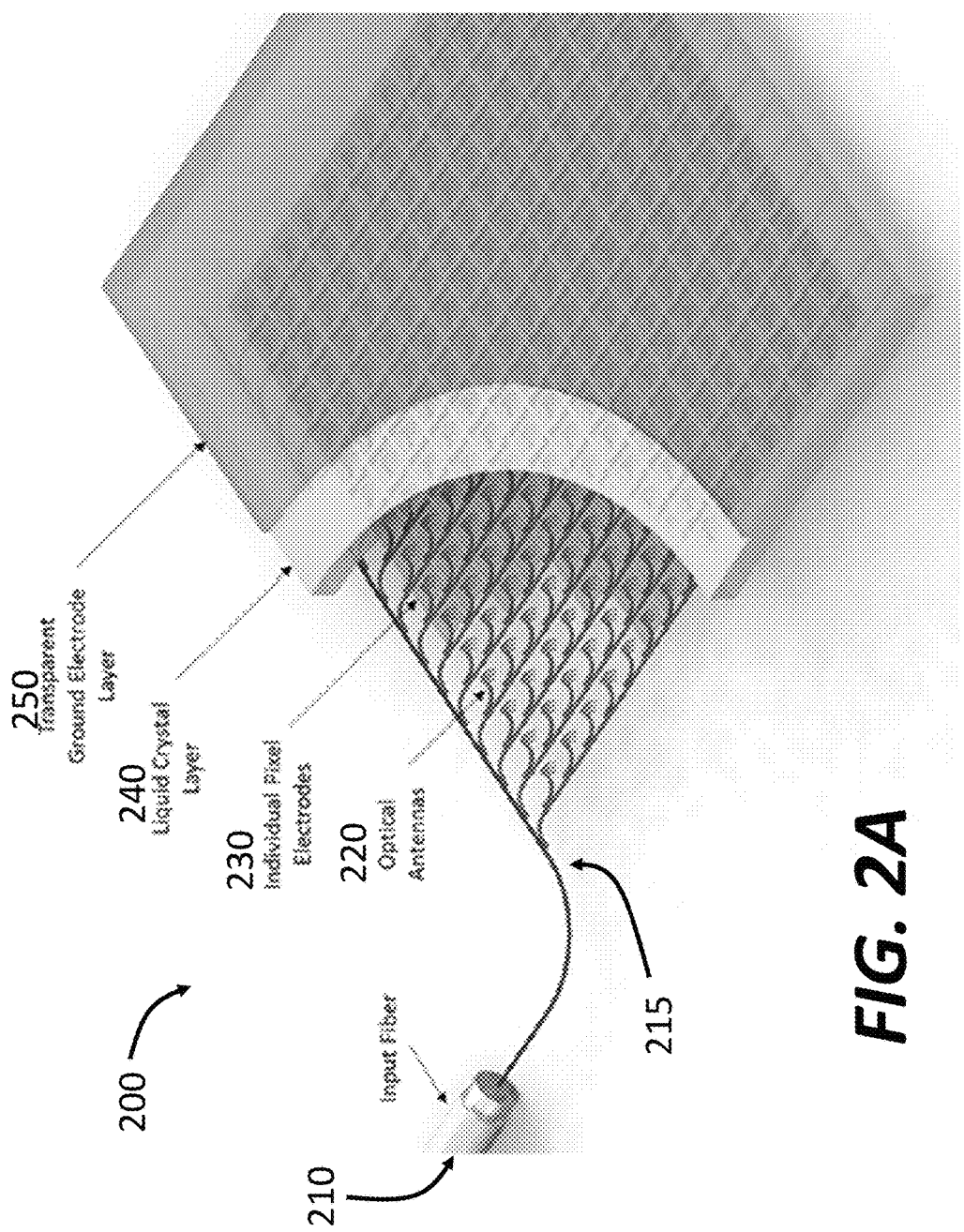
FIG. 2A shows a schematic of an OPA using liquid crystal for out-of-plane phase modulation.

FIG. 2A shows a schematic of an OPA 200 using liquid crystal for out-of-plane phase modulation. The OPA 200 includes an array of optical antennas 220 with a fiber-coupled input 215. In general, directional couplers can be used to deliver the desired fractions of the input light from a main bus waveguide to row bus waveguide and subsequently from row bus waveguides to individual antennas. The lengths of these directional couplers can be precisely controlled during the fabrication process to ensure uniform light emission over the entire array. Each antenna in the array of antennas 220 can include an optical grating for the directional emission of light. A liquid crystal layer 240 is disposed on the surface above the antennas 220 to implement phase modulation. The liquid crystal layer 240 is sandwiched between a transparent ground electrode layer 250 and individual antenna electrodes 230. The individual antenna electrodes 230 include multiple electrodes, each of which is placed in the vicinity of a corresponding antenna in the array of antennas 220. Different electrodes in the individual antenna electrodes 230 may be insulated from each other so as to implement individual phase modulation for each antenna in the array of antennas 220.

In one example, the individual antenna electrodes 230 can be transparent so as to allow light emission from the antennas 220. In another example, each electrode in the individual antenna electrodes 230 can include a metal electrode with a central aperture to allow light emitted by the antenna to pass through. Phase tuning of the emitted light can be carried out by changing the bulk refractive index of the overlying liquid crystal layer 240 by applying a localized electric field using the individual antenna electrodes 230. The transparent ground electrode layer 250 can include a layer of uniformly deposited transparent conductive material. The transparent conductive material can include, for example, indium tin oxide (ITO), transparent conductive oxides (TCOs), conductive polymers, carbon nanotubes (CNTs), graphene, nanowire meshes, ultra-thin metal films, or any other material known in the art.

Figures 2B, 2C, 2D:
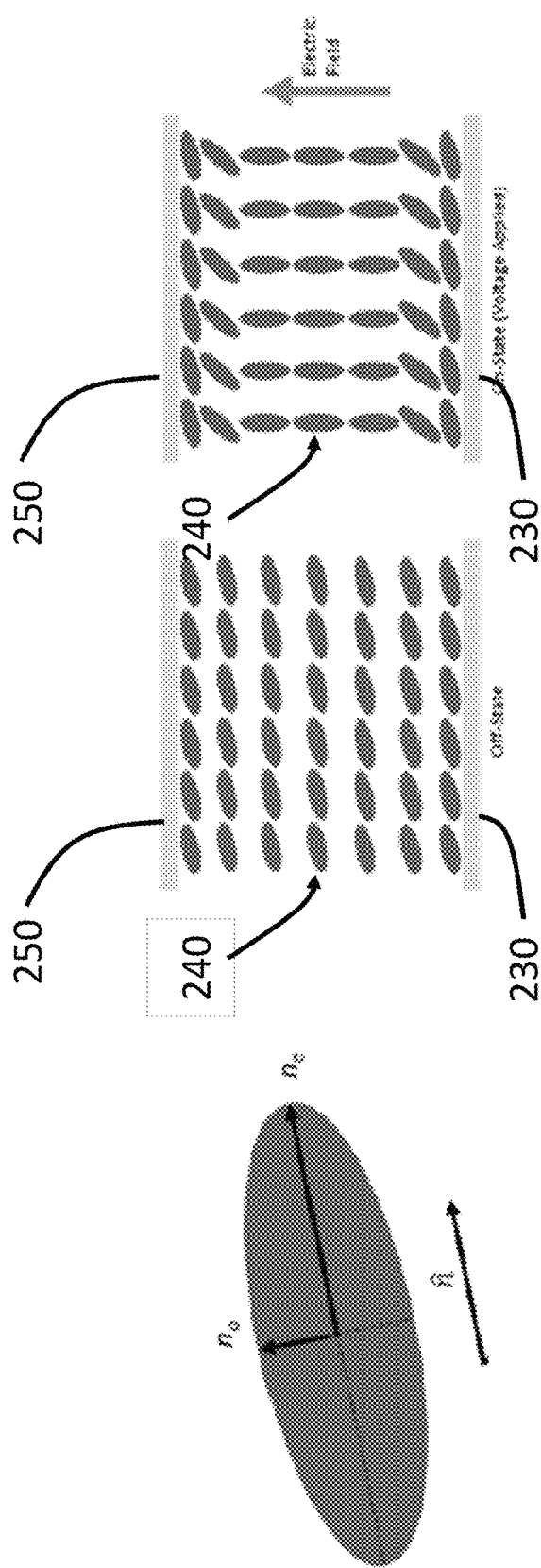
FIGS. 2B-2D illustrate phase modulation by liquid crystal materials in the OPA shown in FIG. 2A FIGS. 2E-2G illustrate in-plane phase modulation in an integrated waveguide with a tunable liquid crystal cladding.

FIGS. 2B-2D illustrate phase modulation in the OPA 200 using liquid crystal. In this case, the liquid crystal layer 240 can include nematic liquid crystal, which in the nematic phase can be operated in electrically controlled birefringence (ECB) mode. FIG. 2B shows a schematic of liquid crystal birefringence with respect to the director of n̂ crystal. The ordinary index $n_o$ is perpendicular to the director n̂ while the extraordinary index $n_e$ is parallel to the director n̂.

In ECB mode, applying a voltage across the electrodes 250 and 230 can cause the liquid crystal material in liquid crystal layer 240 to align with an axis that is at an angle with respect to the normal angle. The effective refractive index as seen by the incoming light can then depend on this angle due to the birefringence exhibited by the liquid crystal, thereby modulating the phase of the light propagating through the liquid crystal layer 240.

In one example, the liquid crystal layer 240 can perform only phase modulation without affecting the amplitude of light beam propagating through the liquid crystal layer 240. In another example, both the phase and amplitude of the light emitted by the corresponding antenna can be modulated by, for example, a spatial light modulators (SLM). SLMs usually include arrays of pixels in which the amplitude and relative phase of light entering each pixel is tuned, typically by using liquid crystals or micro electromechanical systems (MEMS). The amplitudes and phases of different locations in the beam can be modified by the SLM to achieve the desired pattern. Liquid-crystal-based SLMs can be operated in both reflection and transmission mode while MEMS-based devices, in which micro-scale mirrors are arrayed and individually moved up or down to induce relative phase differences between pixels, usually operate in reflection mode. Conventional SLMs use external light sources and discrete bulk optics for collimating and directing the input and output beams that are usually difficult to align in a robust manner. The chip-scale visible light phased array with liquid-crystal-based phase modulation, as described herein, can be advantageous because it incorporates an integrated planar light source 210 along with phase modulation for individual antennas 220. This can eliminate external bulk optics for spatial light modulation and beam shaping applications in which generation of arbitrary far field radiation pattern can be desirable. Large-scale integration techniques can also be applied to fabricate phased arrays for generating multiple high-resolution images from a single chip.

FIGS. 2E-2G illustrate in-plane phase modulation in an integrated waveguide with a tunable liquid crystal cladding. FIG. 2E illustrates that the refractive index seen by the evanescent field of the optical mode, which may be TE- or TM-polarized, can be tuned by applying an electric field across the liquid crystal layer. FIG. 2F shows a schematic of an electrode configuration 201. The configuration 201 includes a waveguide 251 (e.g., a silicon nitride waveguide) fabricated on a silicon oxide layer 241 disposed on a silicon substrate 231. The waveguide 251 can be part of an OPA shown in, for example, FIG. 2A and is surrounded by a liquid crystal layer 211, which is further sandwiched between a pair of electrodes 221a and 221b (collectively referred to as electrodes 221). The electrodes can tune the effective index of the propagating mode for the purpose of phase modulation.

FIG. 2G illustrate phase modulation of emitters in an OPA 202, in which a phase tuning element 212 is incorporated into a waveguide bus 262 from which light is periodically extracted via directional couplers to be delivered to optical antenna elements 252. In this manner, each antenna 252 can be modulated with a distinct phase modulation. In-plane phase modulators may also be used as the arms of an integrated Mach-Zehnder Interferometer (MZI) for modulating the amplitude of light delivered to a single OPA or a single optical antenna element.

4D Light Field Encoding and Depth Perception

As described above, one way for the display 110 shown in FIG. 1 to produce the image 138 is to encode each OPA 112 with a 4D coordinate (x, y, θ, ξ) corresponding to a point in the 4D light field of light rays 102. In this method, adjusting the angle coordinate (θ, ξ) for pixels at location (x, y) can change the depth perception for the viewer.

Figure 3:
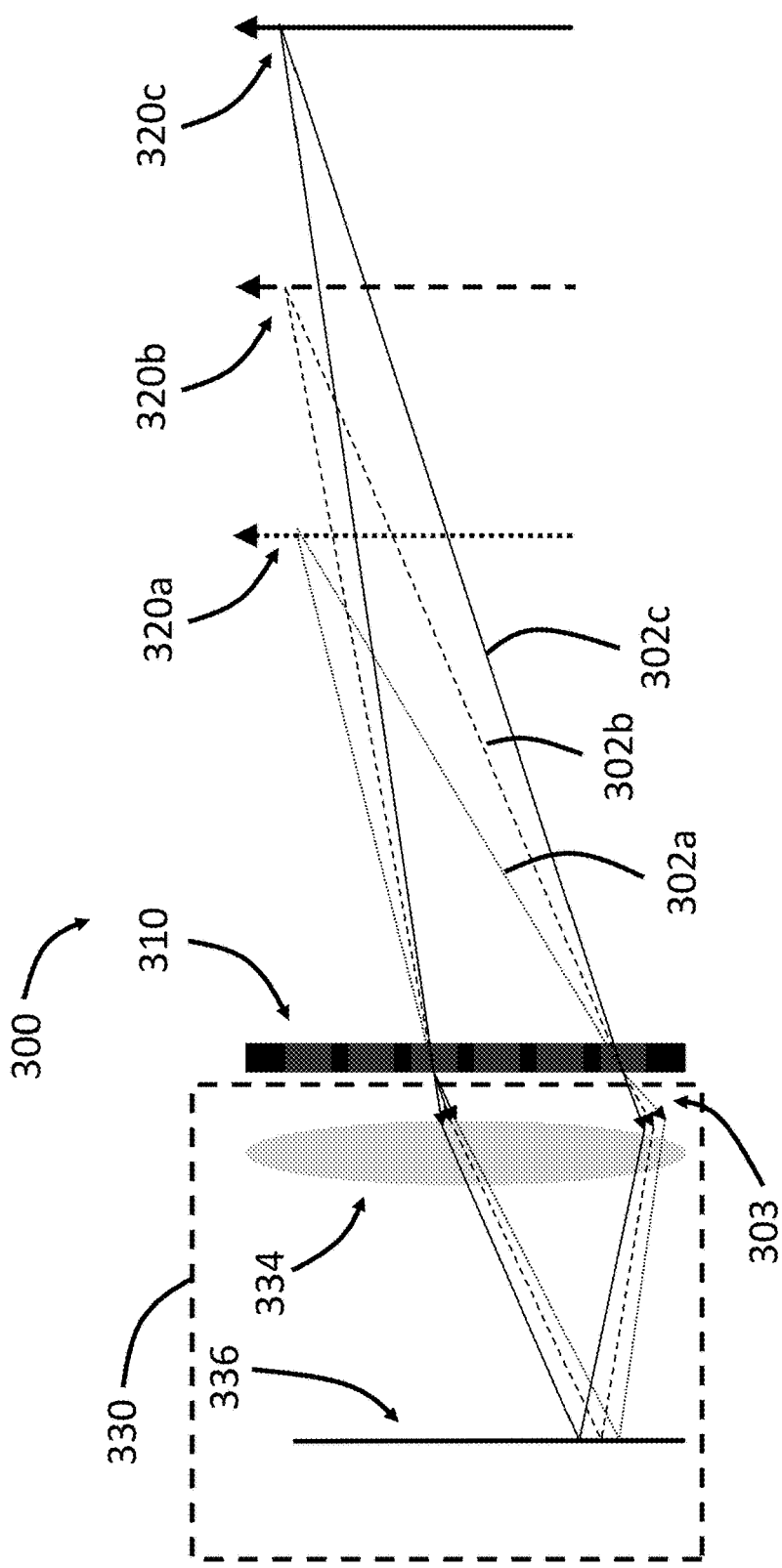
FIG. 3 illustrates the adjustment of depth perception using OPAs.

FIG. 3 shows a system 300 that creates different depth perceptions for the viewer. The system 300 includes a display 310 that can show three virtual objects 320a, 320b, and 320c, each of which is located at a distinct distance away from a viewer's eye 330, which includes a lens 334 and a retina 336. Without the display 310, the first virtual object 320a creates an image on the retina 336 of the eye 330 via light rays 302a. Similarly, the second and third virtual objects 320b and 320c create images on the retina 336 via light rays 302b and 302c, respectively. When the display 310 is placed into the system 300 to recreate the images of the virtual objects 320a to 320c, the display 310 emits light rays 303 that are identical to the light rays 302a to 302c as if the virtual objects 320a to 320c are in front of the eye 330. As can be seen in FIG. 3, different rays in the light rays 303 have different emission angles so as to simulate the light rays 302a to 302c.

In general, a larger range of emission angles can produce a larger range of depth perceptions. The range of emission angles (sometimes also referred to as the dynamic range) of the OPAs in the display 310 can be about 0° to about 20° (e.g., 0°, 1°, 2°, 3°, 5°, 8°, 10°, 12°, 14°, 16°, 18°, and 20°, including all values and sub-ranges in between). In one example, the emission angles of the OPAs in the display 310 can be continuously adjusted within the dynamic range. In another example, the emission angles of the OPAs in the display 310 can include several discrete emission angles. For example, with the dynamic range, the OPAs can be tuned to emit at about 3 different angles to about 20 different angles (e.g., 3 angles, 5 angles, 10 angles, 15 angles, and 20 angles, including any value and sub-ranges in between).

The dynamic range of the emission angles of the OPAs in the display 310 can depend on the spacing or pitch of optical antenna elements within an OPA. Without being bound by any particular theory or mode of operation, for an OPA having a diameter (or other lateral size) of D, the diffraction limit of light (an angular range) emitted by this OPA is $1.22\lambda/D$, where $\lambda$ is the central wavelength of the light. In one example, the dynamic range of the OPAs can be greater than this diffraction limit. In another example, the dynamic range of emission angles of an OPA can be at least 3 times greater than the diffraction limit of the corresponding OPA (e.g., 3 times greater, 5 times greater, 8 times greater, 10 times greater, 15 times greater, 20 times greater, including all values and sub-ranges in between). In yet another example, the OPAs in the display 310 can have a lateral size of about 2 μm to about 20 μm (e.g., 2 μm, 3 μm, 5 μm, 10 μm, 15 μm, and 202 μm, including all values and sub-ranges in between).

Figure 4:
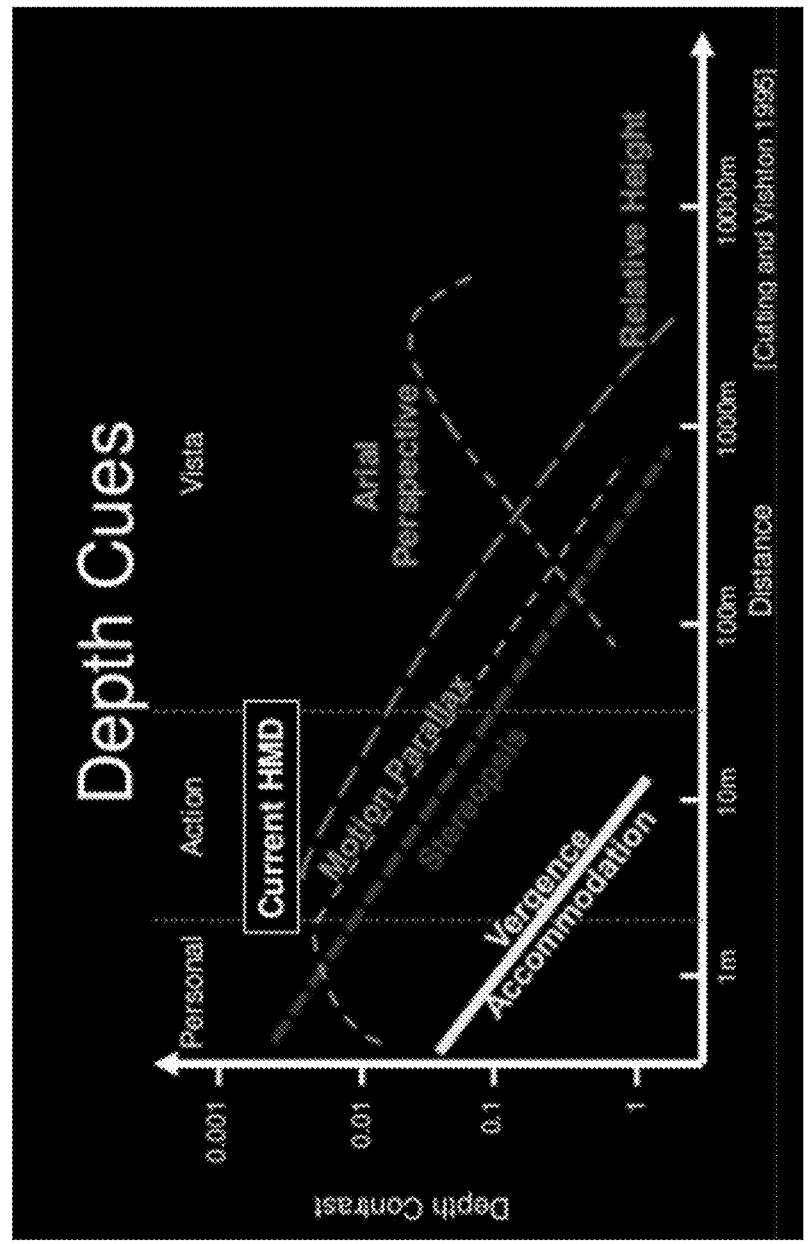
FIG. 4 is a plot showing different ranges of depth cues.

FIG. 4 is a plot showing different ranges of depth cues, including personal depth cues from about 0 meter to about 2 meters, action depth cues from about 2 meters to about 30 meters, and vista depth cues from about 30 meters to infinity. Current HMDs usually only cover action depth cues and are difficult to dynamically adjust the depth cues during operation. The system 300 can address this issue by conveniently tuning the emission angle from OPAs in the display 310. It can also be desirable for the system 300 to cover a depth range as broad as possible (e.g., including all three ranges from personal depth cue to vista depth cue).

The system 300 shown in FIG. 3 includes one display 310 for one eye 330. The display 310 can create monocular vision depth perception for the viewer. By using two displays, each of which is for one eye of a viewer, a binocular depth perception and 3D images can be created for the viewer.

Binocular Vision

Figure 5:
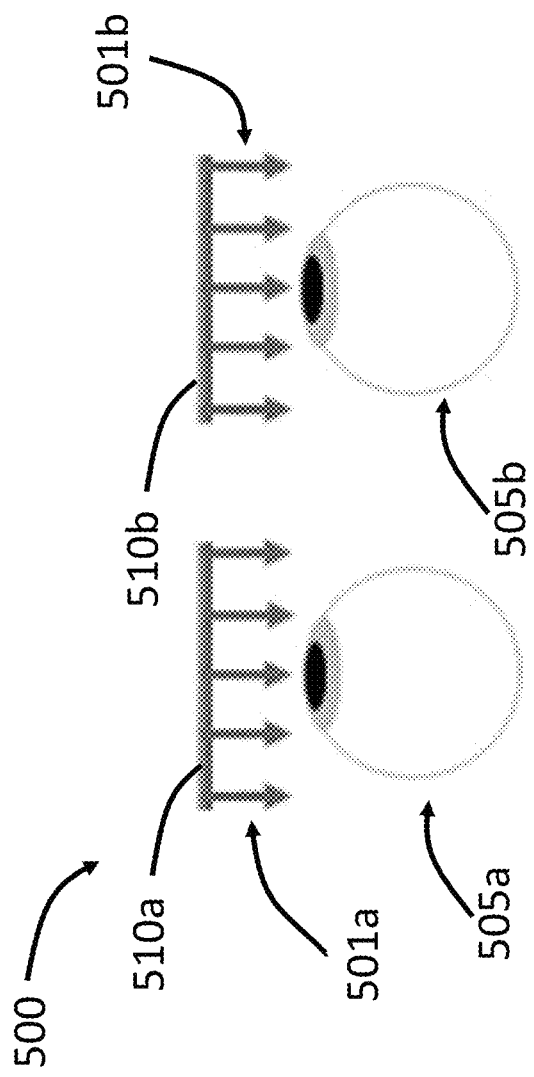
FIG. 5 shows a schematic of using two displays to create binocular vision for a viewer.

FIG. 5 illustrates the creation of binocular vision (sometimes also referred to as stereopsis) using two displays. The system 500 includes two displays 510a and 510b, each of which is placed in front a corresponding eye 505a and 505b of a viewer. The first display 510a emits light beams 501a that can create a first image in the eye 505a, and the second display 510b emits light beams 501b that can create a second image in the eye 505b. As understood in the art, the two images created in the two eyes can be slightly different so as to generate binocular vision. The displays 510a and 510b can be substantially similar to the display 110 shown in FIG. 1 and described above.

AR Displays Including Multi-Color Pixels

In systems described above (e.g., system 100 in FIG. 1, system 200 in FIG. 2A, and system 300 in FIG. 3), each OPA in an array of OPAs forms part of a corresponding pixel. In other words, each pixel in the display includes at least one OPA. A single-color display may have one OPA per pixel. A multi-color display may have multiple OPAs per pixel, with each OPA operating at a different wavelength.

Figure 6A:
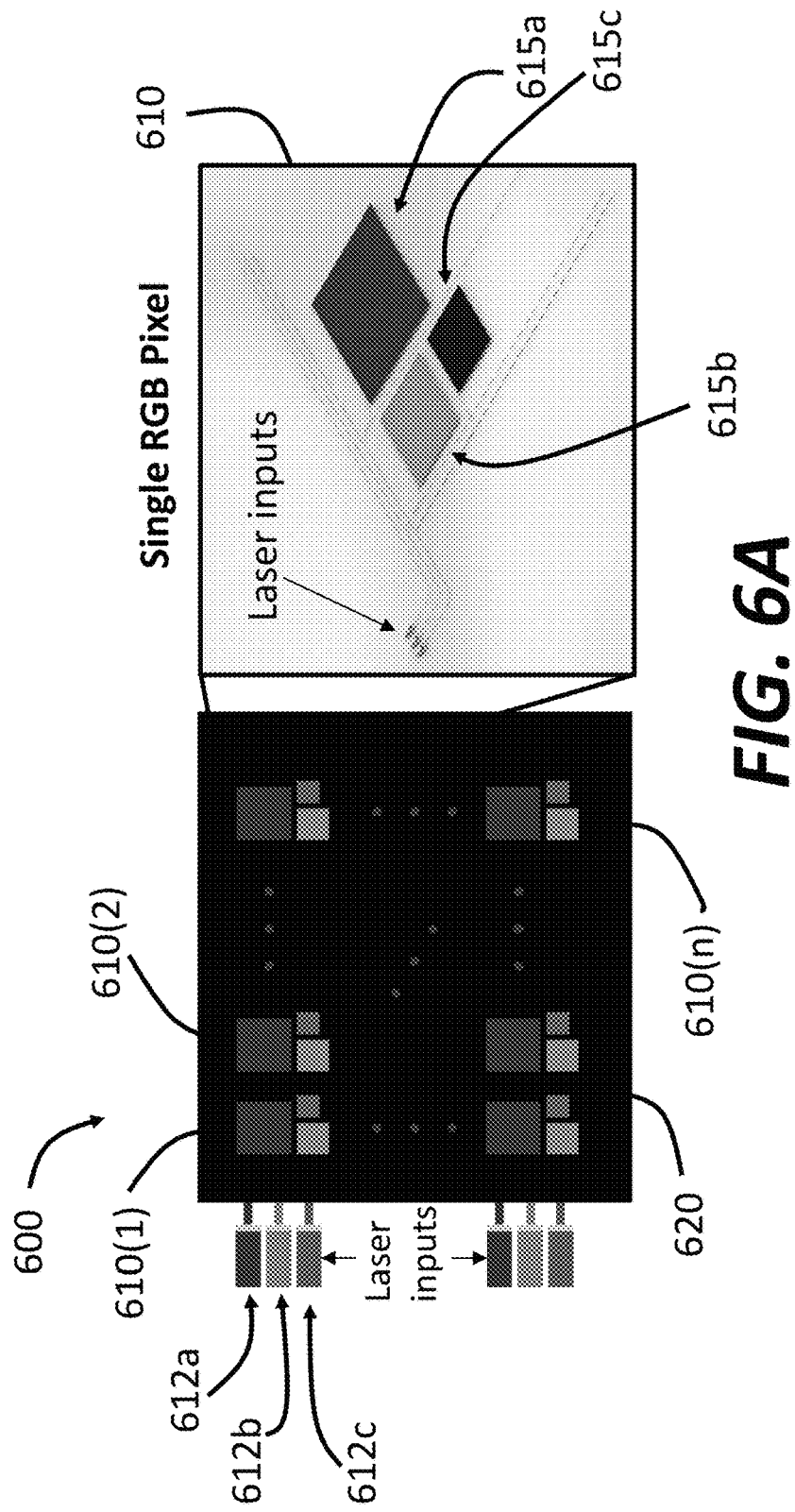
FIG. 6A shows a schematic of a display including an array of pixels where each pixel includes three different OPAs operating at three distinct wavelengths.

FIG. 6A shows a schematic of an example of display 600 including multi-color pixels. The display 600 includes a substrate 620, in or on which an array of pixel elements 610(1), 610(2), . . . , to 610(n) (collectively referred to pixel elements 610) is disposed. For example, the pixel elements 610 can be fabricated in the substrate 620, which can include silicon nitride. Each pixel element 610 further includes three OPAs 615a, 615b, and 615c, each of which operates at a different wavelength. For example, the first OPA 615a can operate at a wavelength between about 580 nm and about 760 nm. The second OPA 615b can operate at a wavelength between about 490 nm and about 580 nm. The third OPA 615c can operate at a wavelength between about 390 nm and about 490 nm. In another example, the three OPAs 615a, 615b, and 615c can operate at red, green, and blue wavelengths, respectively. For each OPA 615a, 615b, and 615c, a corresponding light source 612a, 612b, and 612c is configured to provide light. The display 600, by using three OPAs at three colors, can therefore provide a full-color image for viewers.

Figures 6B, 6C:
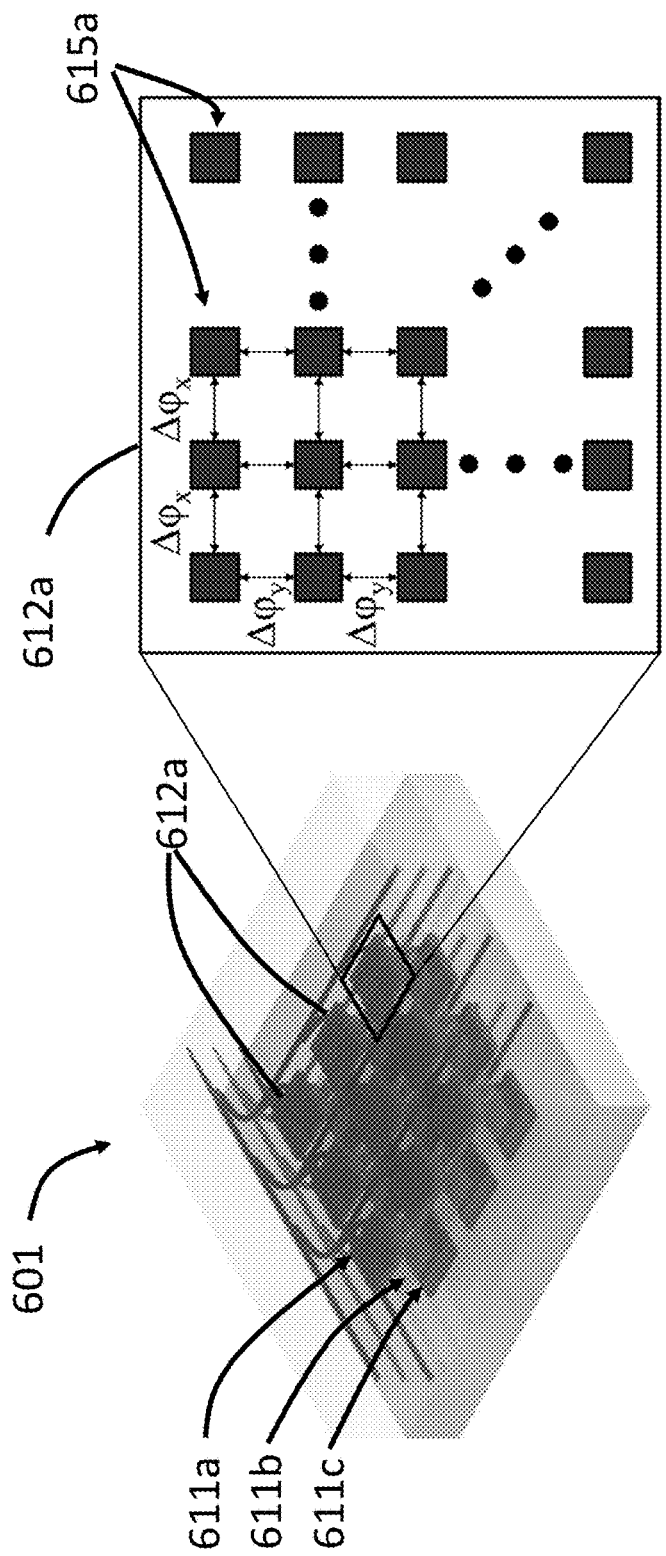
FIGS. 6B and 6C shows a schematic of a display including stacks of displays operating at different wavelengths.

FIGS. 6B-6C show a schematic of a multi-color display 601 in which pixels for emission at different wavelengths are stacked, thereby enabling higher pixel densities. The display 601 includes three display layers 611a, 611b, and 611c stacked together. Each display layer 611a to 611c can include transparent materials so as to allow light transmission through the entire display 601. Each of the display layers 611a to 611c can operate at a distinct wavelength. The display layer 611a includes an array of OPAs 612a, which further includes an array of antennas 615a.

Holographic Encoding of OPAs

Figure 7:
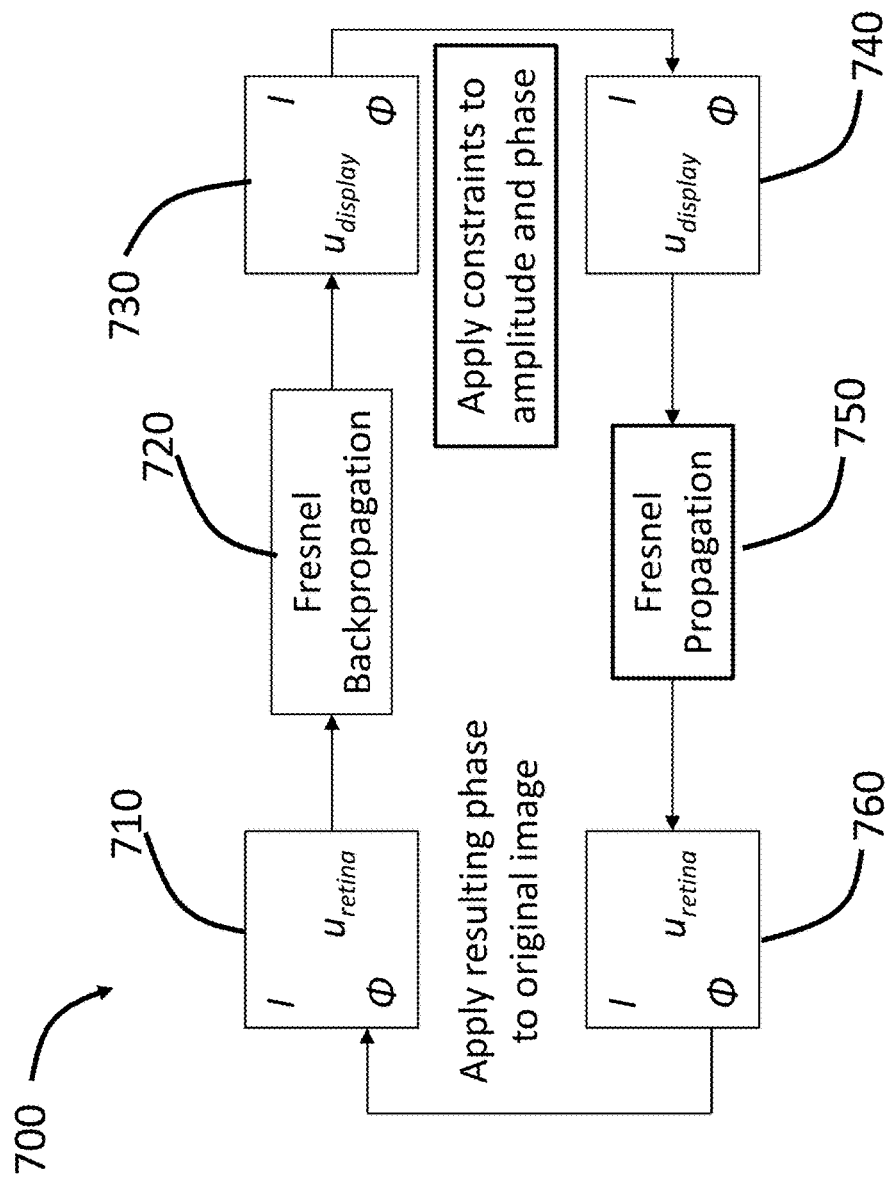
FIG. 7 illustrates a method of encoding holographic information with a display including an array of OPAs.

FIG. 7 illustrates a method 700 of encoding holographic information with a display including an array of OPAs. The method 700, which can be a modified version of the Gerchberg-Saxton (GS) algorithm, starts at step 710, where the intensity distribution of a desired image to be created on the retina of a viewer is inserted. A random phase distribution is assigned to the initial image used in the first iteration. starts at step 710, where a desired image to be created on the retina of a viewer is determined. The intensity and phase distribution (I, Φ), associated with the desired image is also determined. The intensity has a distribution I(x, y), where x and y are spatial coordinates. The phase also has a distribution Φ(x, y). At step 720, a Fresnel back-propagation method is employed to simulate the back-propagation of the intensity and phase distribution ((I(x, y), Φ(x, y)) of the desired image. The back-propagation ends at the location where the display of OPAs is placed. A display intensity and phase distribution ($I_d$(x, y), $\Phi_d$(x, y)) is determined at step 730. This display intensity and phase distribution (($I_d$(x, y), $\Phi_d$(x, y)) is then encoded on the light emitted by the display in step 740. In other words, the array of OPAs discretizes the otherwise continuous intensity and phase distribution (($I_d$(x, y), $\Phi_d$(x, y)). For example, the display can include 16×16 OPAs, each with 16×16 optical antennas, and the discretized intensity and phase distribution can be ($I_d$($x_{i,k}$, $y_{j,l}$), $\Phi_d$($x_{i,k}$, $y_{j,l}$)) where both i and j are integer numbers from 1 to 16 designating a specific OPA and k and l are integer numbers from 1 to 16 designating a specific optical antenna within an OPA. Each OPA may have a finite set of degrees of freedom with which the phase and amplitude of its optical antennas may be configured. For example, the relative phase shift between antennas along both dimensions may be tuned to encode arbitrary phase gradients while keeping the emission amplitude of each antenna the same.

At step 750, the discretized intensity and phase distribution (($I_d(x_{i,k}, y_{j,l})$, $\Phi(x_{i,k}, y_{j,l})$)) is propagated toward the retina using Fresnel propagation (in opposite direction compared to the back-propagation at step 720) so as to examine the accuracy of the discretization at step 740. Upon the arrival of the discretized intensity and phase distribution (($I_d(x_{i,k}, y_{j,l})$, $\Phi_d(x_{i,k}, y_{j,l})$)) at the retina, a projected intensity and phase distribution (($I_p(x_{i,k}, y_{j,l})$, $\Phi_p(x_{i,k}, y_{j,l})$)) is derived. Since the eye does not sense phase, the ability to apply any arbitrary phase distribution to the input image in step 710 provides an additional degree of freedom that enables the hologram optimization algorithm. Specifically, the phase distribution from step 760 is applied to the intensity distribution of the target image in step 710 to be used as the source image for the subsequent iteration while the intensity distribution from step 760 is compared with the target intensity distribution. The resulting intensity distribution from step 760 converges to that of the target image within a certain tolerance after several iterations of the modified GS algorithm. In other words, the amplitude of the resulting image at 760 can be discarded and its phase is applied to the amplitude distribution of the desired input image that was originally inserted at step 710. This image, comprised of the original image's amplitude distribution and the phase distribution from the previous iteration of the GS algorithms, can serve as the input image for the subsequent iteration.

Figure 8:
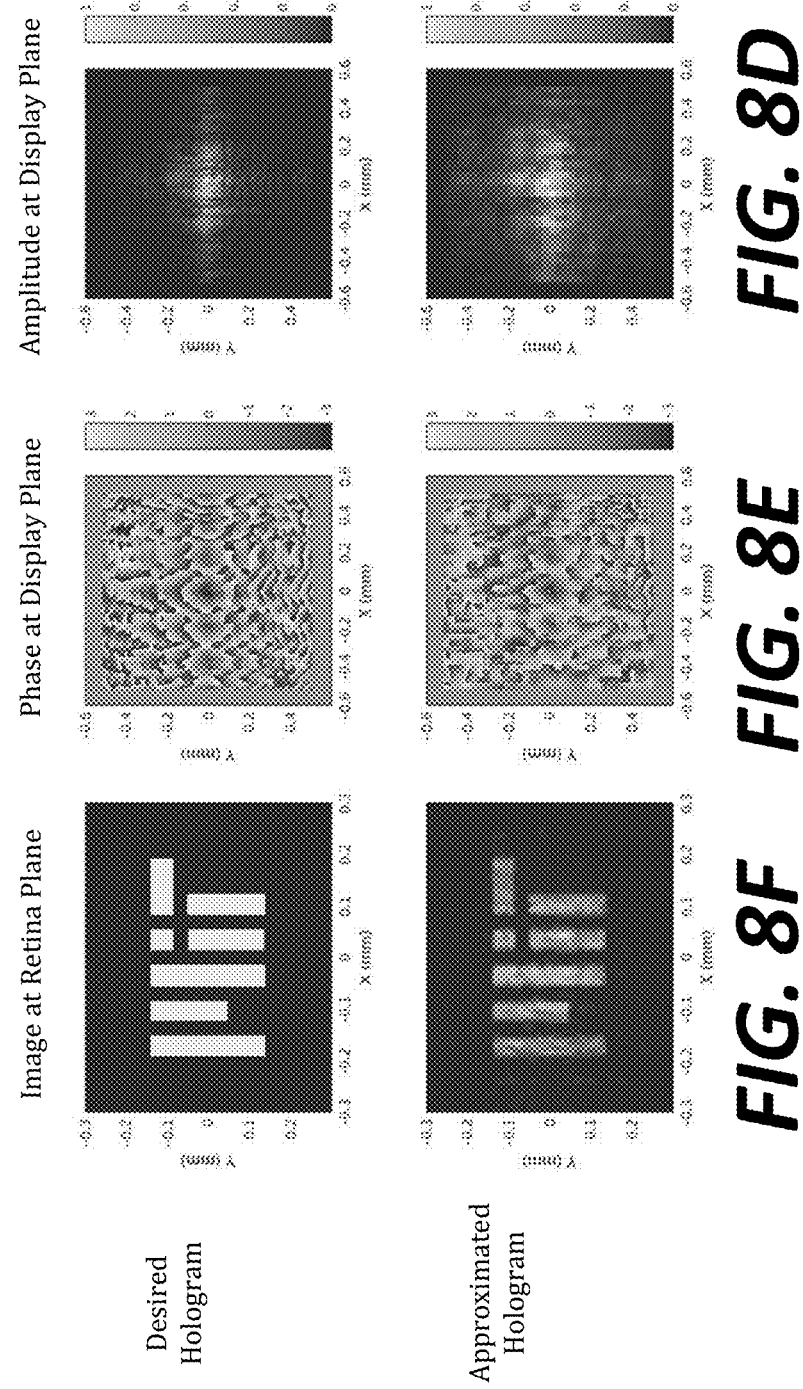
FIG. 8A shows a desired image to be formed on a retina of a viewer using a display including an array of OPAs.
FIGS. 8B and 8C show the corresponding phase distribution and intensity distribution, respectively, to create the desired image shown in FIG. 8A.
FIGS. 8D and 8E show the intensity distribution and phase distribution, respectively, encoded with a display of OPAs to create the desired image shown in FIG. 8A.
FIG. 8F shows the imaged formed on a retina of a viewer using the holographic information shown in FIGS. 8D-8E.

FIGS. 8A-8F show example images and phase and intensity distributions at each step in the method 700 illustrated in FIG. 7. More specifically, FIG. 8A shows a desired image to be formed on a retina of a viewer using a display including an array of OPAs, corresponding to step 710 in the method 700. FIGS. 8B and 8C show the corresponding phase distribution and intensity distribution, respectively, to create the desired image shown in FIG. 8A, corresponding to step 730 in the method 700. FIGS. 8D and 8E show the intensity distribution and phase distribution, respectively, encoded light emitted by a display of OPAs to create the desired image shown in FIG. 8A, corresponding to step 740 in the method 700. FIG. 8F shows the imaged created in an eye of a viewer using the holographic information shown in FIGS. 8D-8E, corresponding to step 760 in the method 700.

Binocular Vision Creation by AR Displays

Binocular vision can be created by two displays projecting two images of an object into the two eyes of a viewer, with each image presenting the object from a slightly different angle (i.e., simulating two eyes of humans). Alternatively, binocular vision can also be created by a single display including an array of OPAs.

Figure 9:
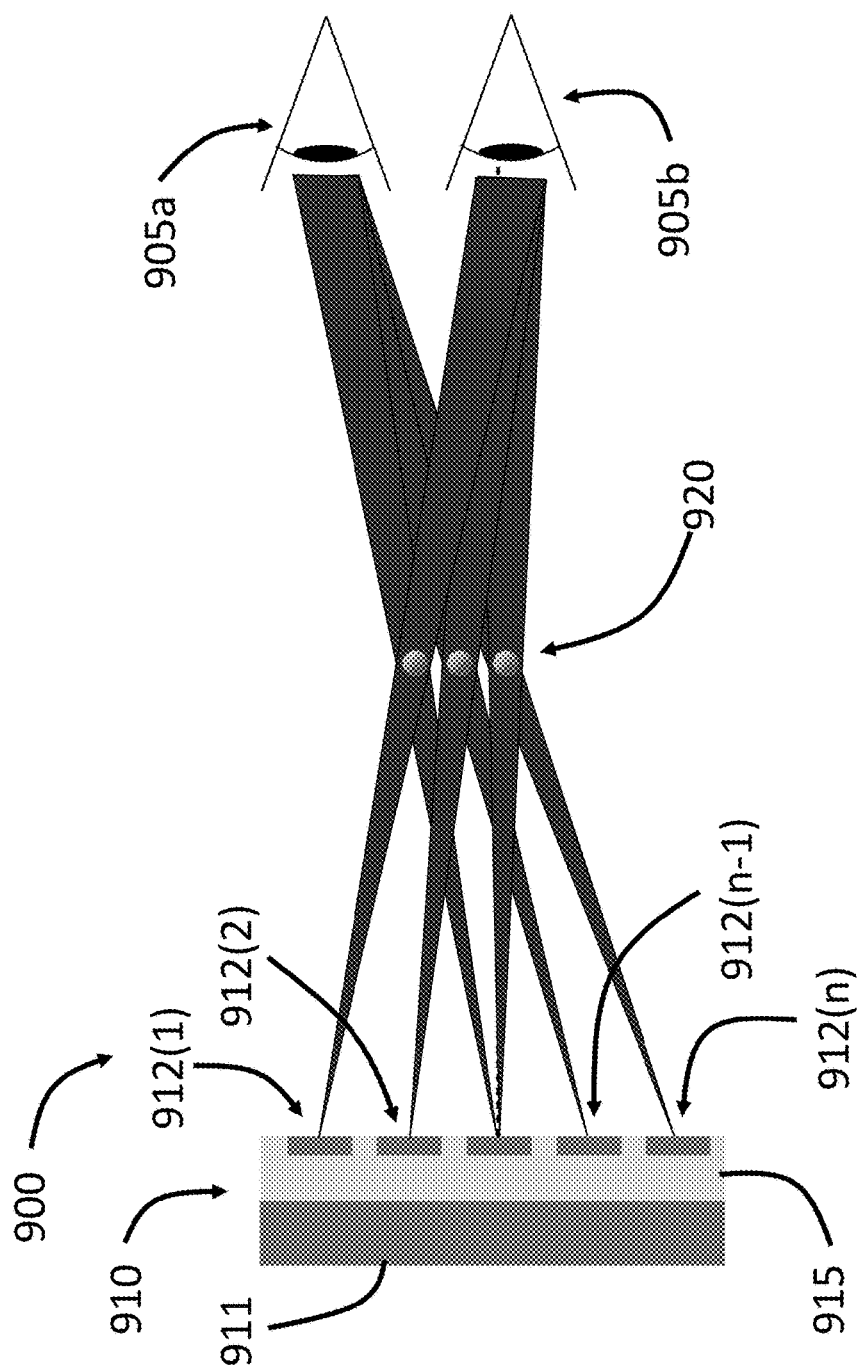
FIG. 9 shows a schematic of a system to create binocular vision using a display including an array of OPAs.

FIG. 9 shows a schematic of a system 900 to illustrate binocular vision creation for a viewer using a single display. The system 900 includes a display 910, which further includes an array of OPAs 912(1), 912(2), . . . , and 912(n) (collectively referred to as OPAs 912). The OPAs 912 can be fabricated in a base layer 915, such as silicon nitride or any other platform known in the art. The base layer 915 is deposited on a substrate 911, which can include, for example, silicon. In the display 910, one group of OPAs (e.g., 912(1) and 912(2)) emits light beams toward a first eye 905a of the viewer and creates a first image of a virtual object on the retina of the viewer. Another group of OPAs (e.g., 912(n−1) and 912(n)) emits light beams toward a second eye 905b of the viewer and creates a second image of the virtual object on the retina of the viewer. The first image and the second image of the virtual object can be slightly different to simulate viewing the virtual object from slightly different angles. A stereographic binocular projection, and the associated depth perception, can therefore be created by these two images projected by the two groups of OPAs.

In one example, the light rays emitted by the first group of OPAs toward the first eye 905a and the light rays emitted by the second group of OPAs toward the second eye 905b can cross each other to create an image volume 920. The image volume 920 can be the 3D space in which an image can exist. In this case, having two sets of OPAs to enable binocular disparity can provide depth information to the viewer, which defines the volume of the image (i.e. it is defined in all three dimensions).

In practice, the viewer's head and the eyes may move around with respect to the display 910. Therefore, it can be desirable for the display 910 to precisely project two images into two eyes of the viewer. To this end, the display 910 can include an eye tracking system to monitor the movement of eyes 905a and 905b. The detected movement can be used to generate a control signal that in turn controls the OPAs 912 to emit light at the correct directions toward the eyes 905a and 905b. Examples of eye tracking systems can be found in U.S. Pat. No. 7,391,887, which is hereby incorporated herein in its entirety.

In one example, OPAs that emit light beams toward a particular eye are fixed, i.e., these OPAs always emit light beams toward the designated eye during operation. In another example, an OPA in the display 910 can emit light beam toward one eye at one time and toward the other eye at another time. For example, the all OPAs 912 in the display 910 can alternately emit light beams toward one eye 905a and the other eye 905b by modulating the phase gradient on the OPAs 912. The modulation frequency (or the rate of steering the OPAs 912) can be greater than 60 Hz, thereby allowing the viewer to perceive binocular vision without noticing the transition of image projection between one eye 905a and the other eye 905b.

Figures 10A, 10B, 10C:
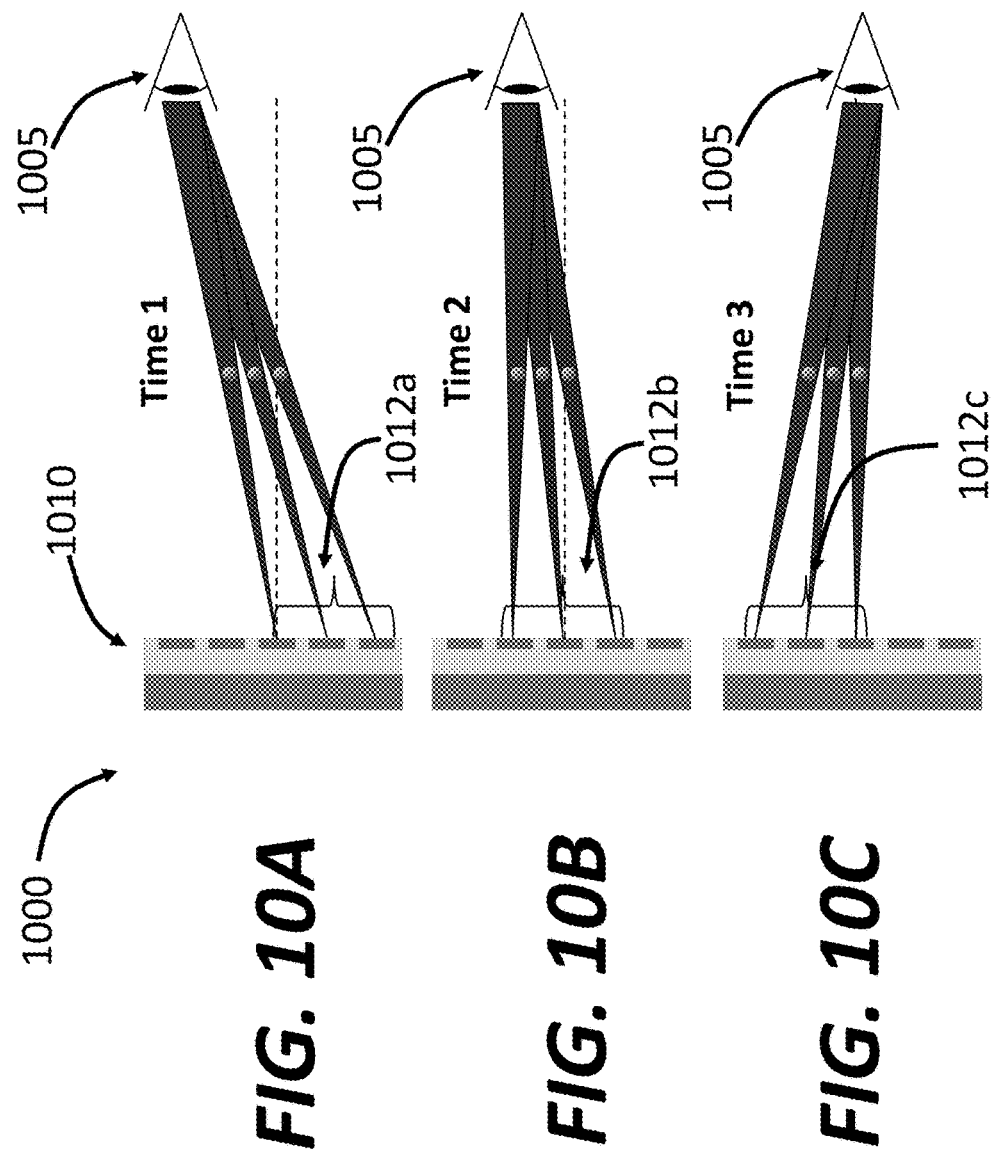
FIGS. 10A-10C illustrate creation of binocular vision by temporally modulating a display including an array of OPAs.

FIGS. 10A-10C shows a schematic of a system 1000 to illustrate binocular vision creation using dynamic tuning of OPAs. The system 1000 includes a display 1010 to emit light beams toward an eye 1005 of the viewer. At one moment, a first group of OPAs 1012a in the display 1010 emits light beams toward the eye 1005, as shown in FIG. 10A. At another moment, a second group of OPAs 1012b in the display 1010 emits light beams toward the eye 1005, as shown in FIG. 10B. At a third moment, as shown in FIG. 10C, a third group of OPAs 1012c in the display 1010 emits light beams toward the eye 1005. At each moment, the rest of the OPAs, other than those emitting light beams toward the eye 1005, can emit light beams toward the other eye so as to create binocular vision.

Temporal viewpoint scanning can be used when there are multiple viewers at arbitrary locations, in which case several OPAs in the display will need to emit light in each of those directions. OPAs may be steered (in time) through each of these angles for this purpose. Also, the diffraction limit may limit the number of discrete angles that may be emitted simultaneously, in which case being able to scan to a different angle in time would be beneficial.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus comprising:
   a first display comprising:
      a first optical phased array (OPA) to emit a first beam at one of a first plurality of steering angles;
      a second OPA to emit a second beam at one of a second plurality of steering angles; and
      a controller, operably coupled to the first OPA and the second OPA, to steer the first beam through the first plurality of steering angles so as to change a first optical pattern created by the first beam and the second beam on a first retina of a viewer,
   wherein a difference between a first steering angle and a second steering angle in the first plurality of steering angles is about 1 degree to about 20 degrees.

2. The apparatus of claim 1, wherein the apparatus comprises eyewear.

3. The apparatus of claim 1, wherein the first display is substantially transparent so as to allow the viewer to see through the first display.

4. The apparatus of claim 1, wherein the first plurality of steering angles comprises at least three different steering angles.

5. An apparatus comprising:
a first display comprising:
- a first optical phased array (OPA) to emit a first beam at one of a first plurality of steering angles;
- a second OPA to emit a second beam at one of a second plurality of steering angles; and
- a controller, operably coupled to the first OPA and the second OPA, to steer the first beam through the first plurality of steering angles so as to change a first optical pattern created by the first beam and the second beam on a first retina of a viewer, wherein a difference between a first steering angle and a second steering angle in the first plurality of steering angles is substantially equal to or greater than $1.22\lambda/D$, wherein $\lambda$ is a wavelength of the first beam and D is a lateral size of the first OPA.

6. An apparatus comprising:
a first display comprising:
- a first optical phased array (OPA) to emit a first beam at one of a first plurality of steering angles;
- a second OPA to emit a second beam at one of a second plurality of steering angles; and
- a controller, operably coupled to the first OPA and the second OPA, to steer the first beam through the first plurality of steering angles so as to change a first optical pattern created by the first beam and the second beam on a first retina of a viewer, wherein an optical path length difference between the first OPA and the second OPA is greater than a coherence length of the first beam.

7. The apparatus of claim 6, wherein the first display is encoded with a four-dimensional light field of a preset image.

8. An apparatus comprising:
a first display comprising:
- a first optical phased array (OPA) to emit a first beam at one of a first plurality of steering angles;
- a second OPA to emit a second beam at one of a second plurality of steering angles; and
- a controller, operably coupled to the first OPA and the second OPA, to steer the first beam through the first plurality of steering angles so as to change a first optical pattern created by the first beam and the second beam on a first retina of a viewer, wherein an optical path length difference between the first OPA and the second OPA is less than a coherence length of the first beam.

9. The apparatus of claim 8, wherein the first display is encoded with holographic information of a preset image.

10. The apparatus of claim 1, further comprising:
a second display to form a second optical pattern, different from the first optical pattern, on a second retina of the viewer so as to create binocular vision for the viewer.

11. The apparatus of claim 1, further comprising:
a first lens, in optical communication with first display, to transmit the first beam and the second beam to the first retina of the viewer so as to create the first optical pattern on the first retina.

12. The apparatus of claim 5, wherein the apparatus comprises eyewear.

13. The apparatus of claim 5, wherein the first display is substantially transparent so as to allow the viewer to see through the first display.

14. The apparatus of claim 5, wherein the first plurality of steering angles comprises at least three different steering angles.

15. The apparatus of claim 5, further comprising:
a second display to form a second optical pattern, different from the first optical pattern, on a second retina of the viewer so as to create binocular vision for the viewer.

16. The apparatus of claim 5, further comprising:
a first lens, in optical communication with first display, to transmit the first beam and the second beam to the first retina of the viewer so as to create the first optical pattern on the first retina.

17. The apparatus of claim 6, wherein the apparatus comprises eyewear.

18. The apparatus of claim 6, wherein the first display is substantially transparent so as to allow the viewer to see through the first display.

19. The apparatus of claim 6, wherein the first plurality of steering angles comprises at least three different steering angles.

20. The apparatus of claim 6, further comprising:
a second display to form a second optical pattern, different from the first optical pattern, on a second retina of the viewer so as to create binocular vision for the viewer.

21. The apparatus of claim 6, further comprising:
a first lens, in optical communication with first display, to transmit the first beam and the second beam to the first retina of the viewer so as to create the first optical pattern on the first retina.

22. The apparatus of claim 8, wherein the apparatus comprises eyewear.

23. The apparatus of claim 8, wherein the first display is substantially transparent so as to allow the viewer to see through the first display.

24. The apparatus of claim 8, wherein the first plurality of steering angles comprises at least three different steering angles.

25. The apparatus of claim 8, further comprising:
a second display to form a second optical pattern, different from the first optical pattern, on a second retina of the viewer so as to create binocular vision for the viewer.

26. The apparatus of claim 8, further comprising:
a first lens, in optical communication with first display, to transmit the first beam and the second beam to the first retina of the viewer so as to create the first optical pattern on the first retina.

* * * * *